(12) United States Patent
Moustafa et al.

(10) Patent No.: US 10,721,307 B2
(45) Date of Patent: Jul. 21, 2020

(54) CONFIGURABLE CONTEXT AWARE SENSORS IN IOT SMART SPACES

(71) Applicant: Intel Corporation, Santa Clara, CA (US)

(72) Inventors: Hassnaa Moustafa, Portland, OR (US); Sanjana K. Kamath, San Jose, CA (US); Eve M. Schooler, Portola Valley, CA (US)

(73) Assignee: INTEL CORPORATION, Santa Clara, CA (US)

( * ) Notice: Subject to any disclaimer, the term of this patent is extended or adjusted under 35 U.S.C. 154(b) by 298 days.

(21) Appl. No.: 15/474,155

(22) Filed: Mar. 30, 2017

(65) Prior Publication Data

US 2018/0288159 A1    Oct. 4, 2018

(51) Int. Cl.
*G06F 15/16* (2006.01)
*H04L 29/08* (2006.01)
(Continued)

(52) U.S. Cl.
CPC .......... *H04L 67/125* (2013.01); *H04L 41/22* (2013.01); *H04W 4/70* (2018.02); *H04W 4/38* (2018.02);
(Continued)

(58) Field of Classification Search
CPC .. G01C 21/3484; H04W 4/027; H04W 4/029; G05D 2201/0212; G01S 13/867; G01S 13/865; G01S 15/931
See application file for complete search history.

(56) References Cited

U.S. PATENT DOCUMENTS 9,846,479 B1 * 12/2017 Brown .................. G06F 1/3296
9,874,923 B1 *  1/2018 Brown .................... H04W 4/70
(Continued)

FOREIGN PATENT DOCUMENTS

WO       2013123445 A1     8/2013

OTHER PUBLICATIONS

Awais Ahmad et al., "Context-Aware Mobile Sensors for Sensing Discrete Events in Smart Environment", Journal Sensors, vol. 2016, Article ID 7283831, pp. 1-10, 2016, Hindawi Publishing Corporation, 10 pages.
(Continued)

*Primary Examiner* — Umar Cheema
*Assistant Examiner* — Tesfu N Mekonen
(74) *Attorney, Agent, or Firm* — Grossman, Tucker, Perreault & Pfleger, PLLC

(57) ABSTRACT

Each of a plurality of Internet of Things (IoT) devices includes at least one sensor. At least some of the plurality of IoT devices may have a single, low power, state. At least some of the plurality of IoT devices may have a first, low-power, low-bandwidth, "STANDBY" state and a second, high-power, high-bandwidth, "ACTIVE" state. Controller circuitry, that may include sensor abstraction circuitry and/or analytics circuitry receives a signal from a first IoT device, analyzes the signal and determines whether to transition a second IoT device from the STANDBY state to the ACTIVE state. The controller circuitry beneficially minimizes power consumption and bandwidth requirements for the second IoT device. The controller circuitry also determines at least one of: an event context or an environmental context.

25 Claims, 13 Drawing Sheets

(51) Int. Cl.
    *H04L 12/24*     (2006.01)
    *H04W 4/70*     (2018.01)
    *H04W 4/38*     (2018.01)

(52) U.S. Cl.
    CPC ............ *Y02D 70/00* (2018.01); *Y02D 70/144* (2018.01); *Y02D 70/166* (2018.01); *Y02D 70/20* (2018.01); *Y02D 70/21* (2018.01); *Y02D 70/22* (2018.01); *Y02D 70/26* (2018.01)

(56) References Cited

U.S. PATENT DOCUMENTS

| | | |
|---|---|---|
| 2014/0244710 A1 | 8/2014 | Sharma et al. |
| 2015/0019717 A1 | 1/2015 | Li et al. |
| 2016/0344841 A1 | 11/2016 | Wang et al. |
| 2017/0038466 A1* | 2/2017 | Salmen ................... G01S 17/89 |
| 2018/0072313 A1* | 3/2018 | Stenneth ............... B60W 30/09 |

OTHER PUBLICATIONS

International Search Report and Written Opinion issued in International Application No. PCT/US2018/020486, dated Jun. 15, 2018, 10 pages.

International Preliminary Report on Patentability issued in International Application No. PCT/US2018/020486, dated Oct. 10, 2019, 7 pages.

* cited by examiner

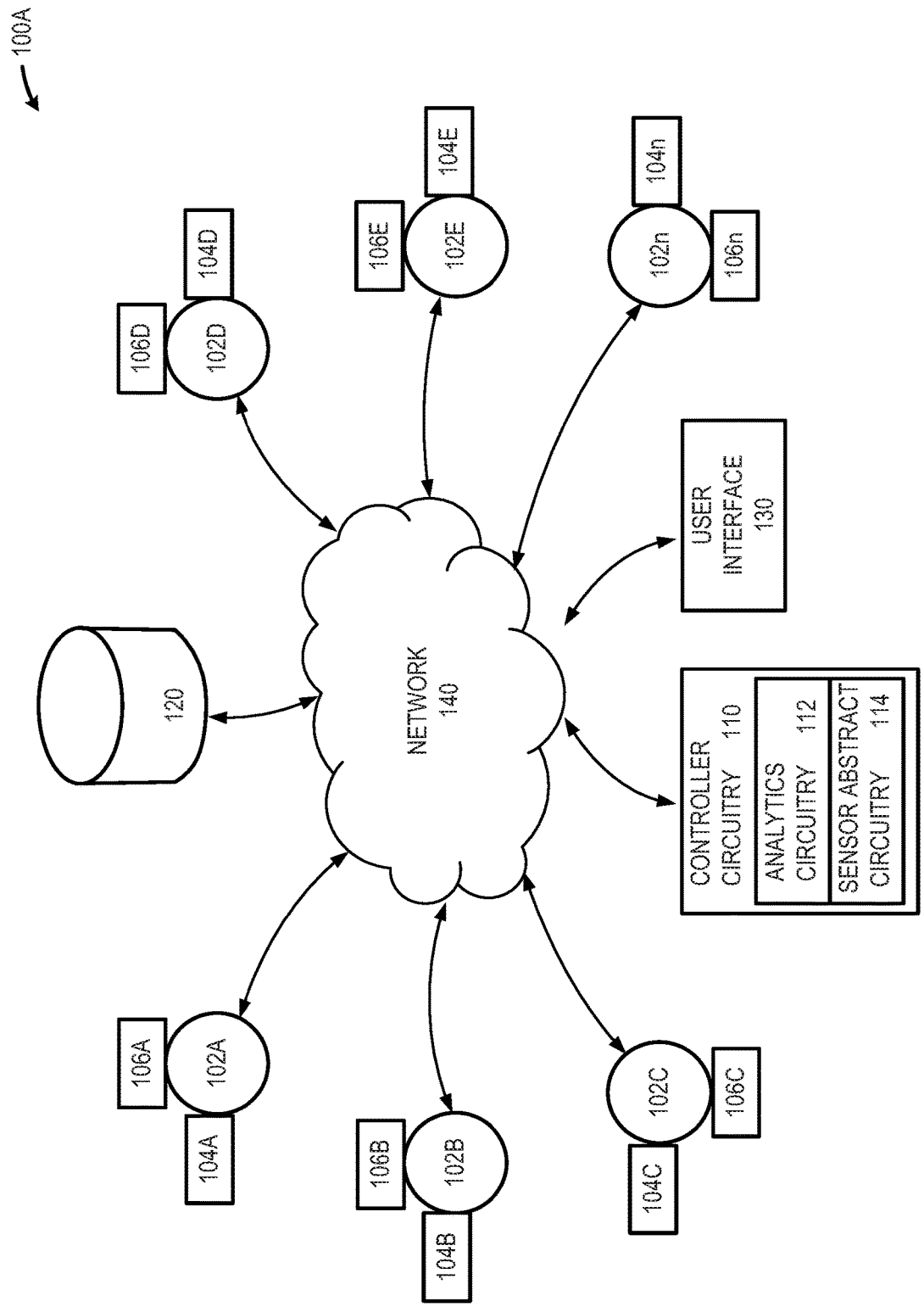

CONFIGURABLE CONTEXT AWARE SENSORS IN IOT SMART SPACES

TECHNICAL FIELD

The present disclosure relates to technologies for context aware sensor configuration.

BACKGROUND

The Internet of Things (IoT) includes the networking of physical or smart devices containing electronics, software, sensors, actuators, and network connectivity enabling the smart devices to collect and exchange data. Such smart devices find use throughout the modern world, including in smart energy distribution grids, smart homes and commercial buildings, intelligent transportation, autonomous vehicles, and smart cities. Each smart device is uniquely identifiable through an embedded computing system and interoperates with other smart devices via the Internet. The IoT extends connectivity beyond machine to machine (M2M) communications to include a variety of protocols, domains, and applications.

The use of the term "things" is indicative of the wide variety of communications capable and/or Internet connected smart devices. Such smart devices include, but are not limited to fields as diverse as biomedical monitoring, livestock transponders, biodiversity and environmental health monitoring. The volume and variety of smart devices will generate a large volume of data from diverse locations.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 1A is a schematic depicting an example Internet of Things (IoT) collaborative sensor system that includes a plurality of IoT devices, centralized controller circuitry that includes dedicated sensor abstraction circuitry and analytics circuitry, one or more network connected data storage devices, and one or more network connected user interfaces, in accordance with at least one embodiment described herein;

Figure 1B:
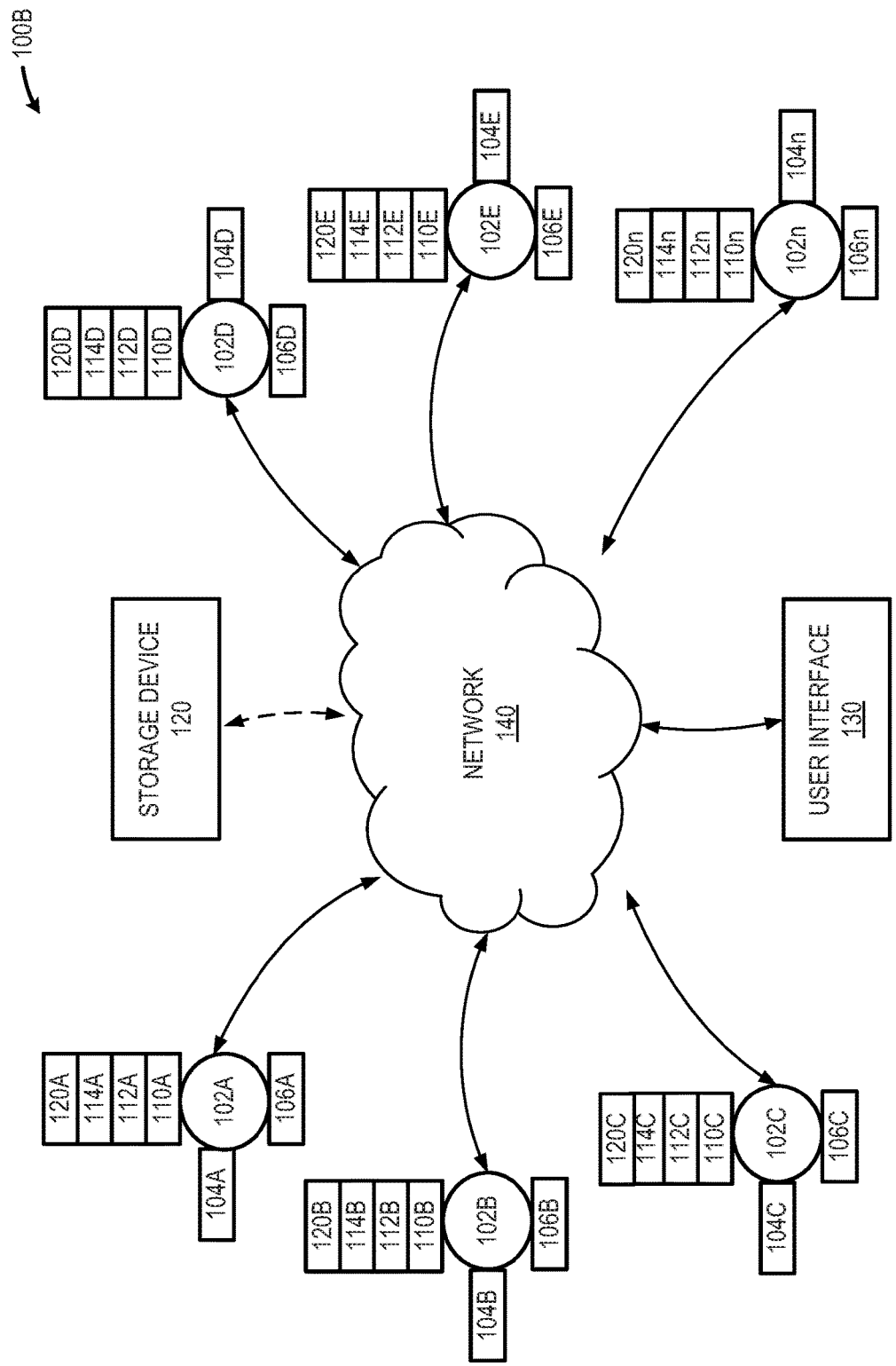
FIG. 1B is a schematic depicting an example Internet of Things (IoT) collaborative sensor system that includes a plurality of IoT devices, each of which includes: respective controller circuitry; respective sensor abstraction circuitry; and respective analytics circuitry, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems, methods, and apparatuses disclosed herein employ a network that includes a plurality of IoT smart devices coupled to one or more controllers. The one or more controllers may variously include a single or centralized controller or a plurality of controllers that are distributed among some or all of the plurality of sensors. The systems, methods, and apparatuses described herein permit user configuration of the one or more controllers via a user interface that is communicably coupled to the one or more controllers. The systems, methods, and apparatuses described herein permit the collaborative operation of some or all of the plurality of sensors by causing at least a first sensor and a second sensor to collaboratively work together to detect an identified event. Upon the first sensor detecting an occurrence of the event, one or more controllers determine whether the event fulfills a defined event action criterion. If the event is determined to fulfill the defined action event criterion, the one or more controllers trigger a specific action by one or more sensors/actuators. The one or more controllers determine at least one event context related to the event.

In embodiments, the first sensor may include one or more relatively low power sensors and the second sensor may include one or more relatively high power sensors. The first sensor may have a single, relatively low power, operating state. The second sensor may have multiple operating states that include, but are not limited to, a relatively low power or "standby" state in which the second sensor produces little or even no output data and a relatively high power or "active" state in which the second sensor produces output data. Thus, both power savings and bandwidth conservation may be achieved if the relatively low power, relatively low data output rate, first sensor is used as a threshold device to activate transition the second sensor from a relatively low power, relatively low data output rate "standby" state to a relatively high power, relatively high data output rate "active" state.

In embodiments, the one or more controllers may also use information provided by the first sensor and/or information provided by the second sensor to determine one or more environmental contexts. The one or more controllers may use the one or more event contexts and/or the one or more environmental contexts to determine an activation interval duration. The activation interval duration represents the time the one or more controllers maintain the second sensor in the high-power, high data rate, "ACTIVE" operating state prior to transitioning back to the low-power, low data rate "STANDBY" operating state.

A system to control a plurality of Internet of Things (IoT) devices is provided. The system may include: a plurality of sensors, each of the plurality of sensors operably coupled to a respective one of the plurality of IoT devices; at least one controller communicably coupled to at least some of the plurality of sensors; at least one user interface communicably coupled to the at least one controller, the user interface to provide information indicative of at least one defined event action criteria; at least one storage device that includes instructions that, when executed by the at least one controller, cause the at least one controller to: receive, from a first sensor in a low power operating state and included in the plurality of sensors, a first signal that includes information indicative of an occurrence of at least one defined event; determine whether the information indicative of the occurrence of the at least one defined event fulfills the at least one defined event action criteria; transition a second sensor remote from the first sensor and included in the plurality of sensors from a low-power operating state to a high-power operating state responsive to a determination that the information indicative of the occurrence of the at least one defined event fulfills the at least one defined event action criteria; receive, from the second sensor included in the plurality of sensors, a signal that includes information indicative of an occurrence of at least one defined event; determine at least one event context using at least one of: the information included in the first signal provided by the first sensor; and the information included in the second signal provided by the second sensor; and determine an activation interval duration for the second sensor based at least in part on the determined at least one event context.

A method of controlling a plurality of Internet of Things (IoT) devices is provided. The method may include receiving, by at least one controller, a first signal that includes information indicative of an occurrence of at least one defined event, the first signal provided by a first sensor included in a plurality of sensors communicably coupled to the at least one controller, wherein each of the plurality of sensors is operably coupled to a respective one of the plurality of IoT devices; determining, by the at least one controller, whether the information indicative of the occurrence of the at least one defined event fulfills the at least one defined event action criteria; activating, by the at least one controller, a second sensor included in the plurality of sensors responsive to a determination by the at least one controller that the information indicative of the occurrence of the at least one defined event fulfills the at least one defined event action criteria; receiving a second signal that includes information indicative of the occurrence of the at least one defined event, the second signal provided by the second sensor included in a plurality of sensors communicably coupled to the at least one controller; determining, by the at least one controller, at least one event context using at least one of: the information provided by the first sensor; and the information provided by the second sensor; and determining, by the at least one controller, an activation interval duration for the second sensor based at least in part on the determined at least one event context.

A non-transitory machine-readable medium that includes instructions is provided. The instructions, when executed by at least one controller, may cause the at least one controller to: receive a first signal that includes information indicative of an occurrence of at least one defined event, the first signal provided by a first sensor included in a plurality of sensors communicably coupled to the at least one controller, wherein each of the plurality of sensors is operably coupled to a respective one of a corresponding plurality of IoT devices; determine whether the information indicative of the occurrence of the at least one defined event fulfills the at least one defined event action criteria; activate a second sensor included in the plurality of sensors responsive to a determination by the at least one controller that the information indicative of the occurrence of the at least one defined event fulfills the at least one defined event action criteria; receive a second signal that includes information indicative of the occurrence of the at least one defined event, the second signal provided by the second sensor included in a plurality of sensors communicably coupled to the at least one controller; determine at least one event context using at least one of: the information included in the first signal provided by the first sensor; and the information included in the second signal provided by the second sensor; and determine an activation interval duration for the second sensor based at least in part on the determined at least one event context.

A system for controlling a plurality of Internet of Things (IoT) devices is provided. The system may include: a means for receiving a first signal that includes information indicative of an occurrence of at least one defined event, the first signal provided by a first sensor included in a plurality of sensors communicably coupled to the at least one controller, wherein each of the plurality of sensors is operably coupled to a respective one of the plurality of IoT devices; a means for determining whether the information indicative of the occurrence of the at least one defined event fulfills the at least one defined event action criteria; a means for activating a second sensor included in the plurality of sensors responsive to a determination by the at least one controller that the information indicative of the occurrence of the at least one defined event fulfills the at least one defined event action criteria; a means for receiving a second signal that includes information indicative of the occurrence of the at least one defined event, the second signal provided by the second sensor included in a plurality of sensors communicably coupled to the at least one controller; a means for determining at least one event context using at least one of: the information provided by the first sensor; and the information provided by the second sensor; and a means for determining an activation interval duration for the second sensor based at least in part on at least one event context.

As used herein the terms "top," "bottom," "lowermost," and "uppermost" when used in relationship to one or more elements are intended to convey a relative rather than absolute physical configuration. Thus, an element described as an "uppermost element" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in a number of additional databases, each having an identified relationship to the accessed element. In another example, if "A" is logically associated with "B," accessing "A" will expose or otherwise draw information and/or data from "B," and vice-versa.

FIG. 1A depicts an example collaborative Internet of Things (IoT) sensor system 100A that includes a plurality of IoT devices 102A-102n (collectively, "IoT devices 102"), centralized controller circuitry 110 that includes dedicated sensor abstraction circuitry 112 and analytics circuitry 114, one or more network connected data storage devices 120, and one or more network connected user interfaces 130, in accordance with at least one embodiment described herein. Each of the IoT devices 102A-102n respectively includes at least one sensor 104A-104n (collectively, "sensors 104") and a power source 106A-106n (collectively, "power source 106"). Each IoT device 102 communicably couples to the controller circuitry 110 via network 140.

At least some of the IoT devices 102 may operate using a single operating state, such as an "always on" operating state. In embodiments, IoT devices 102 in the "always on" operating state may operate in a reduced or low power demand state. In embodiments, IoT devices 102 in the "always on" operating state may operate at a reduced or low data transmission rate.

At least some of the IoT devices 102 may operate in one of a plurality of operating states, such as a first "standby" operating state and a second "active" operating state. In embodiments, IoT devices 102 placed in the first or "standby" operating state may present a low or reduced power demand state. In some embodiments, IoT devices 102 placed in the first or "standby" operating state may present a zero or no power demand state. In embodiments, IoT devices 102 placed in the first or "standby" operating state may present a low or reduced data transmission rate state. In other embodiments, IoT devices 102 placed in the first or "standby" operating state may present a zero or no data transmission rate state. In embodiments, IoT devices 102 placed in the second or "active" operating state may present a higher power demand than when placed in the first or "standby" operating state. In other embodiments, IoT devices 102 placed in the second or "active" operating state may present a higher data transmission rate than when placed in the first of "standby" operating state.

In operation, a first IoT device 102A operates in a low power, but "always on" state. The sensor 104A coupled to the first IoT device 102A collects information indicative of an occurrence of a first defined event, such as a motion event. In response, the first IoT device 102A communicates, via network 140, a signal containing information and/or data indicative of the first defined event to the controller circuitry 110. Analytics circuitry 112 receives the signal and determines whether the information and/or data fulfills at least one defined event action criteria, such as a size of the object creating the motion event is sufficiently large to represent a human form. Responsive to determining the event fulfills the at least one defined event action criteria, the controller circuitry, the controller circuitry 110 may cause a second IoT device 102B to transition from a first, low-power/low data transmission, "standby" state to a second, high-power/high-data transmission, "active" state. Once in the "active" state, a second sensor 104B coupled to the second IoT device 102B communicates a second signal containing information and/or data indicative of the first defined event to the controller circuitry 110. The controller circuitry 110 receives the second signal, and using the information and/or data from the first signal and the information and/or data from the second signal determines at least one event context, such as a motion event has occurred by a subject having a human form. The controller circuitry 110 may also determine an activation interval duration and/or event occurrence (e.g., conclusion of the first defined event) to transition the second IoT device 102B from the "active" state to the "standby" state thereby beneficially providing reduced power and network bandwidth consumption.

The IoT devices 102 may include any current or future developed device capable of communicably coupling to the controller circuitry 110. At least some IoT devices 102 included in the plurality of IoT devices may be self-powered using a primary (i.e., non-rechargeable) or secondary (i.e., chargeable) energy storage device, such as a battery, capacitor, super-capacitor, ultra-capacitor, fuel cell, or similar. In some implementations, at least some of the IoT devices 102 may be powered using one or more external energy sources, such as an external power distribution grid.

Each of the IoT devices 102A-102n carries one or more respective internal or external sensors, detectors, sensing elements, or similar devices 104A-104n (collectively, "sensors 104"). The at least one sensor 104 may include any number and/or combination of any currently available and/or future developed sensing elements. Example sensing elements include, but are not limited to, visible imaging sensing elements, infrared imaging sensing elements, ultraviolet imaging sensing elements, static imaging sensing elements, video imaging sensing elements, tactile sensing elements, thermal sensing elements, pressure sensing elements, acoustic sensing elements, or combinations thereof.

In embodiments, the at least one sensor 104 provides at least one output signal that includes information and/or data indicative or representative of an occurrence of one or more events proximate or near the IoT device 102 carrying the sensor 104. Such events may occur internal and/or external to the respective IoT device 102. In embodiments, the IoT device 102 communicates or otherwise transmits the signal to the controller circuitry 110 via network 140. The at least one sensor 104 includes one or more sensing elements and/or sensing element arrays. In embodiments, the at least one sensor 104 may include a plurality of sensors that measure the same process variable (temperature, pressure, motion, light level, infrared emissions, etc.) using the same or different technologies and/or sensing elements. For example, in one implementations, an IoT device 102 may include a first sensor 104A such as a cup anemometer that provides an output signal indicative of wind speed and a second sensor 104B such as a vane anemometer that provides an output signal indicative of wind speed and direction. In embodiments, the at least one sensor 104 may include one or more environmental sensors capable of detecting and/or measuring one or more parameters associated with the ambient environment about the IoT device 102.

In embodiments, the at least one sensor 104 may include one or more sensors to measure, monitor, and/or detect one or more environmental conditions internal or external to the host IoT device 102. Examples of such environmental sensors 104 may include, but are not limited to: a temperature sensor, a pressure sensor, a real-time clock, a geolocation system, a user address book, a list containing user "favorite" locations, persons, etc., or combinations thereof.

In some implementations, some or all of the IoT devices 102 may include logic circuitry capable of performing limited analysis of the information and/or data acquired by the at least one sensor 104. For example, some or all of the IoT devices 102 may include image analysis circuitry coupled to one or more image sensors that acquire images in some or all of the visible portion of the electromagnetic spectrum (i.e., wavelengths between 390 nanometers and 700 nanometers) and/or one or more image sensors that acquire images in some or all of the non-visible portion of the electromagnetic spectrum (i.e., ultraviolet wavelengths below 390 nanometers or infrared wavelengths above 700 nanometers). The image analysis circuitry may perform functions such as noise reduction, object detection, object dimensioning, object classification, facial recognition, biometric analysis, or combinations thereof. The signal provided by the IoT device 102 to the controller circuitry 110 may therefore contain raw image information and/or data, enhanced image information and/or data, image content information and/or data, or combinations thereof.

The controller circuitry 110 may include any number and/or combination of electronic components, semiconductor devices, and/or logic elements capable of executing one or more machine readable instruction sets to provide the sensor abstraction circuitry 112. The controller circuitry 110 may include any number and/or combination of electronic components, semiconductor devices, and/or logic elements capable of executing one or more machine readable instruction sets to provide the analytics circuitry 114. The controller circuitry 110 may be disposed in one or more network devices or systems communicably coupled to the network 140. Example network devices include, but are not limited to, one or more cloud-based servers, one or more portable processor-based devices, one or more desktop processor-based devices, one or more mainframe processor-based devices, or combinations thereof. One or more processors, microprocessors, single- or multi-core processors, and/or single- or multi-thread processors may provide all or a portion of the controller circuitry 110. In some implementations, an IoT gateway or edge device may provide some or all of the controller circuitry 110. In some implementations, one or more edge devices capable of data collection and/or aggregation may provide all or a portion of the controller circuitry 110.

The sensor abstraction circuitry 112 may include any number and/or combination of electronic components, semiconductor devices, and/or logic elements capable of converting a plurality of signals containing the information and/or data associated indicative and/or representative of the first event to a common format prior to forwarding the information and/or data included in the signals to the analytics circuitry 114. In some implementations, all of the signals provided by the sensors 104 may be routed through the sensor abstraction circuitry 112 prior to introduction to the analytics circuitry 114. In some implementations, only a portion of the signals provided by the sensors may be routed through the sensor abstraction circuitry 112.

The analytics circuitry 114 may include any number and/or combination of electronic components, semiconductor devices, and/or logic elements capable of analyzing information and/or data received from a plurality of sensors 104. In embodiments, the analytics circuitry 114 may use at least a portion of the information and/or data received from a first sensor 104A to determine whether an event detected by the first sensor 104A fulfills at least one defined event action criterion. The defined event action criteria may include any measurable parameter associated with the defined event indicated by the information and/or data in the signal received from sensor 104A. For example, a defined event criterion for a motion event may include, but is not limited to: object velocity, object direction, object acceleration, object size, or combinations thereof. In another example, a defined event criterion for a thermal event may include, but is not limited to: maximum detected temperature, thermal profile, thermal extent, or combinations thereof.

If the analytics circuitry 114 determines the event detected by the first sensor 104A fulfills the defined event action criterion, the analytics circuitry 114, acting either directly or via the controller circuitry 110, causes a second IoT device 102B to transition from a first "standby" state to a second "active" state. After transitioning to the second IoT device 102B to the active state, sensor 104B transmits a signal that includes information and/or data associated with the detected event to the analytics circuitry 114 (via the controller circuitry 110).

In embodiments, responsive to receiving the signal from the second IoT device 102B, the analytics circuitry 114 determines at least one event context using at least one of: the information and/or data included in the signal provided by the first sensor 104A and/or the information and/or data included in the signal provided by the second sensor 104B. In embodiments, the event context may include any information and/or data associated with the event detected by the first sensor 104A and/or the second sensor 104B. In embodiments, the event context may include any information and/or data generated by the analytics circuitry 114 using some or all of the information and/or data associated with the event detected by the first sensor 104A and/or the second sensor 104B. In some implementations, the analytics circuitry 114 may include or may be communicably coupled to machine learning circuitry that is trained to determine an event context using any number of positive or negative training sets that include information and/or data associated with the event detected by the first sensor 104A and/or the second sensor 104B.

The event context may include any information and/or data associated with the occurrence of the event itself and may or may not be directly related to the event occurrence. For example, a first sensor 104A may detect an occurrence of movement indicative of a motion event. In response to detecting a motion event that fulfills a defined event criterion of "motion event" the analytics circuitry 114 may cause a second sensor 104B, such as a thermal imaging sensor, to transition from a low-power standby state to a high-power active state.

In the active state, the second sensor 104B may generate a signal that includes data indicative of the size of the moving object detected by the first sensor 104A based on the thermal signature of the object. The analytics circuitry 114 may determine the data in the signal received from the second sensor is indicative of a human sized object.

Using the data from both the first sensor 104A (movement of an object) and the second sensor 104B (human sized object), the analytics circuitry 114 may determine an event context of movement of a human size object proximate the first sensor 104A and the second sensor 104B. Thus, the ability to provide not only an indication that the event has occurred, but also one or more contexts surrounding the event provides a significant advantage in determining an appropriate response to the event.

The analytics circuitry 114 may also receive information and/or data from one or more environmental sensors 104. The environmental sensor may provide the first sensor 104A (e.g., a sensor having a single, low power mode), the second sensor 104B (e.g., a sensor having a first, standby, low-power, state and a second, active, high power state. In some implementations, the analytics circuitry 114 may combine information and/or data received from a first sensor 104A with environmental information and/or data received from a second sensor 104B to generate an environmental context for the detected event. Combining event information and/or data (e.g., information and/or data provided by the sensor(s) 104A on the first IoT device 102A) with environmental information and/or data (e.g., information and/or data provided by the sensor(s) 104B on the second IoT device 102B) beneficially provides a level of nuanced information that current sensors are unable to provide. For example, a first IoT device 102A may provide a signal that includes information the analytics circuitry 114A interprets as fulfilling the at least one defined event action criterion. In response, the controller circuitry 110A may cause a second IoT device 102B to transition from a "standby" to an "active" state. The second IoT device 102B may then provide environmental information such as a light level and time to the controller circuitry 110. Using this information, in one instance, the analytics circuitry 114 may determine the motion event occurred at a time and/or location that is acceptable based on one or more defined rules stored on the storage device 120. In another instance, the analytics circuitry 114 may determine the motion event occurred at a time and/or location that is unacceptable based on one or more defined rules stored on the storage device 120.

The storage device 120 may include any currently available or future developed system or device capable of storing or otherwise retaining information and/or data. In embodiments, all or a portion of the storage device 120 may be disposed with the controller circuitry 110 in a common device, such as a smartphone, handheld processor-based device, desktop processor-based device, mainframe device, cloud based server device, or similar. In embodiments, the storage device 120 may include one or more network connected storage devices. In some implementations, the storage device 120 may include machine- or processor-readable instruction sets. For example, instruction sets executed by the controller circuitry 110 to provide, form, or otherwise create the sensor abstraction circuitry 112. In another example, instruction sets executed by the controller circuitry 110 to provide, form, or otherwise create the analytics circuitry 114.

The user interface 130 may include any currently available or future developed system or device capable of producing output perceptible by a system user and/or receiving input provided by a system user. The user interface 130 may include one or more output devices such as one or more video output devices, one or more audio output devices, one or more tactile output devices, or combinations thereof. The user interface 130 may include one or more input devices such as one or more tactile input devices, one or more audio input devices, one or more touchscreen input devices, one or more text input devices, one or more pointing input devices. In embodiments, the user interface 130 may be disposed with the controller circuitry 110 in a common device or housing, such as a smartphone, handheld processor-based device, desktop processor-based device, mainframe device, cloud based server device, or similar.

The network 140 may include any number and/or combination of wired and/or wireless networks. Example networks include, but are not limited to, one or more: local area networks (LANs); wide area networks (WANs); wireless wide area networks (WWANs); metropolitan area networks (MANs); personal area networks (PANs); worldwide networks (Internet); or combinations thereof.

FIG. 1B depicts an example system 100B that includes a plurality of IoT devices 102A-102n, each of which includes: respective controller circuitry 110A-110n; respective sensor abstraction circuitry 112A-112n; and respective analytics circuitry 114A-114n, in accordance with at least one embodiment described herein. In some implementations, each of the plurality of IoT devices 102A-102n may include a respective storage device 120A-120n. In other implementations, a storage device 120 may be communicably coupled to each of the IoT devices 102 via network 140. A user interface 130 may be communicably coupled to some or all of the IoT devices 102 via network 140.

In some embodiments, partial functionality of the controller circuitry 110 may be distributed across each of some or all of the IoT devices 102. In embodiments employing partial or full distributed controller circuitry functionality, each of the IoT devices 102 may perform, provide, and/or complete a portion of sensor abstraction circuitry 112 and/or the analytics circuitry 114. Thus, in embodiments employing partial or full distributed controller circuitry functionality, each IoT device 102 may communicate with one or more of the remaining IoT devices 102 to provide the complete functionality of the sensor abstraction circuitry 112. Further, in embodiments employing partial or full distributed controller circuitry functionality, each IoT device 102 may communicate with one or more of the remaining IoT device 102 to provide the complete functionality of the analytics circuitry 114.

In embodiments employing partial or full distributed controller circuitry functionality, each of the IoT devices 102 may communicably couple to at least one other IoT device 102 via one or more IoT gateways or similar centralized device (e.g., a star network configuration). In other embodiments employing partial or full distributed controller circuitry functionality, each of the IoT devices 102 may communicably couple directly with one or more of the other IoT devices 102 (e.g., a mesh network configuration). In yet other embodiments employing partial or fill distributed controller circuitry functionality, each of the IoT devices 102 may communicably couple to at least one other IoT device 102 either directly or through one or more intervening devices such as a "master" IoT device 102 or via an IoT gateway or similar device (e.g., a hybrid star/mesh network configuration).

In other embodiments, each of the IoT devices 102A-102n may include full or complete (i.e., non-distributed or fully distributed) controller circuitry 110A-110n. Thus, in such embodiments, each of the IoT devices 102 includes the full functionality of the sensor abstraction circuitry 112 and/or the analytics circuitry 114. In implementations where each of the IoT devices 102 includes controller circuitry 110 capable of performing the functionality of the sensor abstraction circuitry 112 and the analytics circuitry 114, the sensor abstraction circuitry 112 may convert the signal received from the sensor 104 carried by the respective IoT device 102 to a common signal format prior to forwarding the signal to the analytics circuitry 114. Where the IoT device 102 includes multiple sensors, the sensor abstraction circuitry 112 converts the signals from some or all of the sensors $104A_1$-$104A_n$ to a common signal format prior to forwarding the signals to the analytics circuitry.

In some implementations, the analytics circuitry 114A-114n disposed in some or all of the IoT devices 102A-102n may share sensor data received from sensors 104A-104n carried by the respective IoT device 102. In such implementations, the analytics circuitry 114 may collaboratively or cooperatively analyze the signals received from some or all of the sensors 104A-104n. In such implementations, the analytics circuitry 114A-114n in some or all of the IoT device 102A-102n may determine whether an event detected by some or all of the sensors 104A-104n fulfills at least one defined event action criterion. Such an analysis beneficially leverages the collective capabilities of the controller circuitry in a plurality of IoT devices. Such an arrangement may assist in detecting a malfunctioning sensor 104 and/or IoT device 102 or in minimizing or mitigating the impact of a malfunctioning or failed sensor and/or IoT device 102. In such implementations, the analytics circuitry 114A-114n in some or all of the IoT devices 102A-102n may cause a second IoT device 102B to transition from a first "standby" state to a second "active" state.

In other implementations, the analytics circuitry 114A-114n in each of the IoT devices 102A-102n may independently analyze sensor data received from a first sensor $104A_1$ and any additional sensors $104A_2$-$104A_n$ carried by the respective IoT device 102A. In such implementations, the results generated by the analytics circuitry 114A may be shared with the analytics circuitry 114B-114n in some or all of the remaining IoT devices 102B-102n prior to determining whether the detected event fulfills at least one defined event action criterion. In such implementations, the results generated by the analytics circuitry 114A may be shared with the analytics circuitry 114B-114n in some or all of the remaining IoT devices 102B-102n prior to determining whether to transition another IoT device 102B from a standby state to an active state.

As depicted in FIG. 1B, in embodiments, each of the IoT devices 102A-102n may include a respective storage device 120A-120n. In such implementations, the machine-readable instruction sets executed by the controller circuitry 110A-110n to provide the sensor abstraction circuitry 112A-112n and/or the analytics circuitry 114A-114n may be stored locally in the at the IoT device 102. In other embodiments, a centralized storage device 120 may be communicably coupled to some or all of the IoT devices 102 via the network 140.

Figure 2:
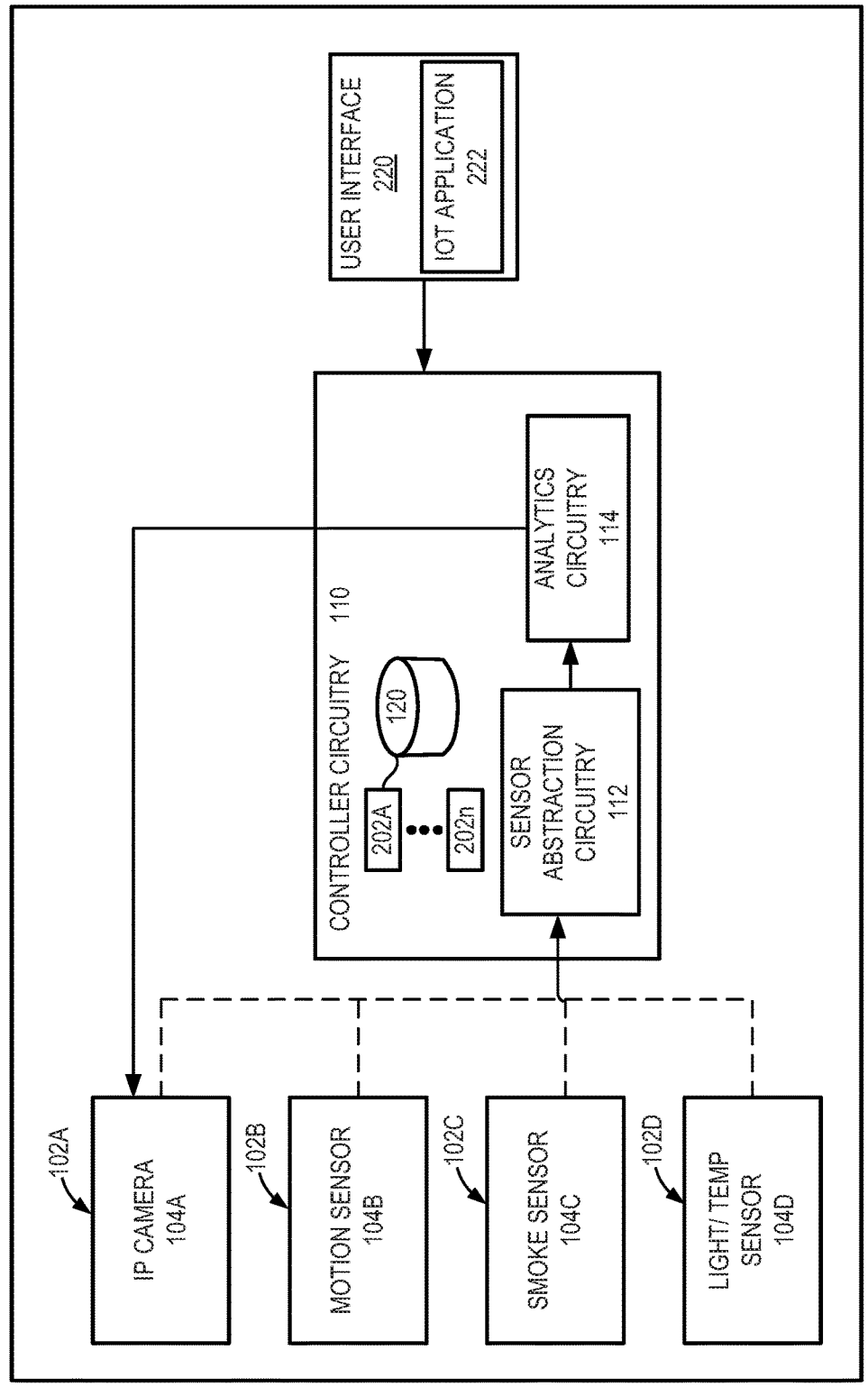
FIG. 2 is a block diagram of an illustrative centralized system in which a number of IoT devices bidirectionally communicate with centralized controller circuitry, in accordance with at least one embodiment described herein.

FIG. 2 is a block diagram of an illustrative centralized system 200 in which a number of IoT devices 102A-102D bidirectionally communicate with centralized controller circuitry 110, in accordance with at least one embodiment described herein. As depicted in FIG. 2, each sensor is communicably coupled to the sensor abstraction circuitry 112 in controller circuitry 110. The sensor abstraction layer 112 communicates some or all of the information and/or data received from the sensors 104A-104D to the analytics circuitry 114. The analytics circuitry 114 determines whether the information and/or data received from a first sensor 104A fulfills one or more event action criterion 202A-202n (collectively, "event action criteria 202"). Such event action criteria 202 may be stored or otherwise retained in one or more data structures, data stores, or databases on the storage device 120. The event action criteria 210 may include, but is not limited to, one or more information and/or data sets and/or data points that characterize a defined event. Thus, event action criteria 210 for a "motion event" may include a respective data set indicative of motion as detected by a motion sensor, accelerometer, or gyroscope.

If the analytics circuitry 114 determines the information and/or data included in the signal received from the first IoT device 102A, the analytics circuitry 114 may cause a second IoT device 102 to transition from a "STANDBY" state to an "ACTIVE" state where the second IoT device begins communicating additional information and/or data associated with, related to, relevant to, or consequential to the occurrence of the defined event as detected by the first IoT device 102A. In embodiments, the first IoT device 102A may include one or more relatively low-powered IoT devices and the second IoT device 102B may include one or more relatively high-powered devices when the second IoT device 102B is placed in the "ACTIVE" state. Thus, using the first IoT device 102A to transition the second IoT device to a higher power "ACTIVE" state only on an occurrence of a defined event confirmed by the analytics circuitry 114 may beneficially reduce the power consumption of the second IoT device 102B. The net reduction in energy consumption by the second IoT device 102B is particularly advantageous where the second IoT device 102B is a portable device powered by a secondary battery, supercapacitor, ultracapacitor, or similar energy storage device.

In embodiments, the second IoT device 102B may remain in the relatively high power consumption "ACTIVE" state for a temporal interval having a duration determined by the controller circuitry 110. At the conclusion of the temporal interval, the controller circuitry 110 may cause the second IoT device 102B to transition from the relatively high-power "ACTIVE" state to a relatively low-power "STANDBY" state. In other embodiments, the second IoT device 102B may remain in the relatively high-power consumption "ACTIVE" state until the conclusion of the defined event initially detected by the first IoT device 102A. In such instances, the second IoT device 102B may remain in the second "ACTIVE" state until the completion of the defined event as determined by at least one of: the analytics circuitry 114, the first IoT device 102A, the second IoT device 102B, or combinations thereof. In some implementations, the second IoT device 102B may remain in the second "ACTIVE" state until a system user manually transitions the second IoT device 102B to the first "STANDBY" state.

The user interface 130 may execute one or more IoT applications 222. In embodiments, the one or more IoT applications 222 may permit system user configuration of the system 200. In embodiments, the one or more IoT applications may permit system user configuration of one or more IoT devices 102 included in the system 200. In some implementations, the one or more IoT applications 222 may permit system user entry of information and/or data associated with one or more defined events.

Figure 3:
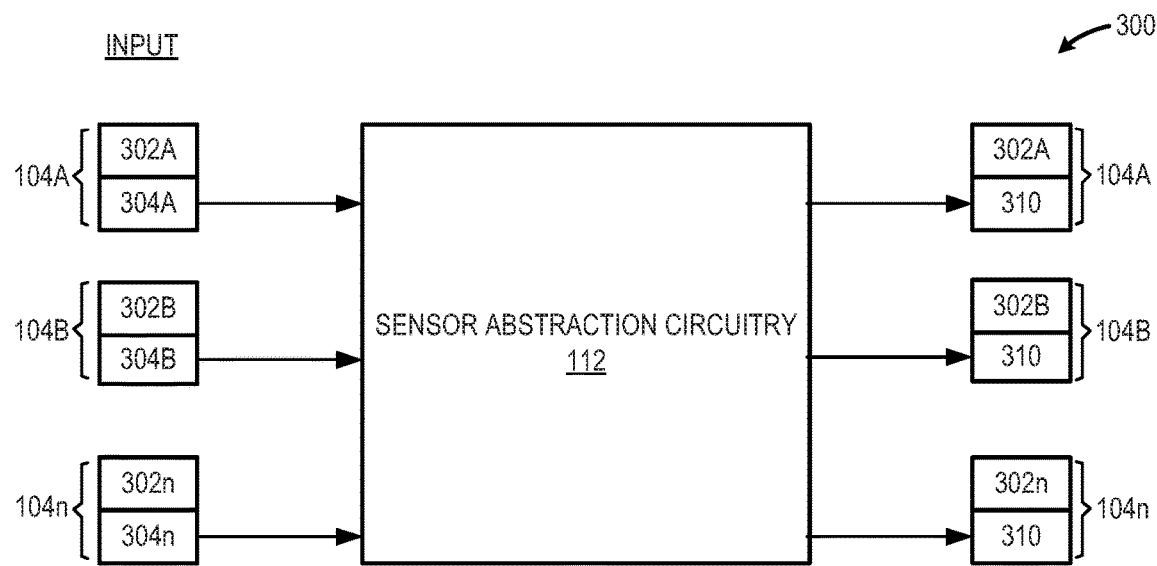
FIG. 3 is an input/output (I/O) diagram depicting an illustrative system that includes sensor abstraction circuitry, in accordance with at least one embodiment described herein.

FIG. 3 is an input/output (I/O) diagram of a system 300 that includes illustrative sensor abstraction circuitry 112, in accordance with at least one embodiment described herein. In embodiments, the sensor abstraction circuitry 112 is a stand-alone device or system that includes any number and/or combination or hard-wired and/or configurable electronic components, semiconductor devices, and/or logic elements. In other embodiments, the control circuitry 110 may form all or a portion of the sensor abstraction circuitry 112. In embodiments, the sensor abstraction circuitry 112 may be disposed in a central location, for example in a network server, cloud-based server, a virtual server, an IoT gateway or similar. In other embodiments, the sensor abstraction circuitry 112 and/or the functionality performed by the sensor abstraction circuitry 112 may be distributed amongst at least a portion of the IoT devices 102.

The sensor abstraction circuitry 112 receives any number of signals 302A-302n (collectively, "signal 302") from one or more sensors 104A-104n. Each of the number of signals 302A-302n may have and/or be communicated by the sensor 104 and/or the IoT device 102 using the same or different signal format 304A-304n, respectively. The sensor abstraction circuitry 112 receives the signal 302 and converts the information and/or data carried by the respective signal 302 to a common output format 310. In some implementations, the output format 310 may include an industry standard data exchange formats. In other implementations, the output format 310 may include a proprietary or closed data exchange format.

Figure 4:
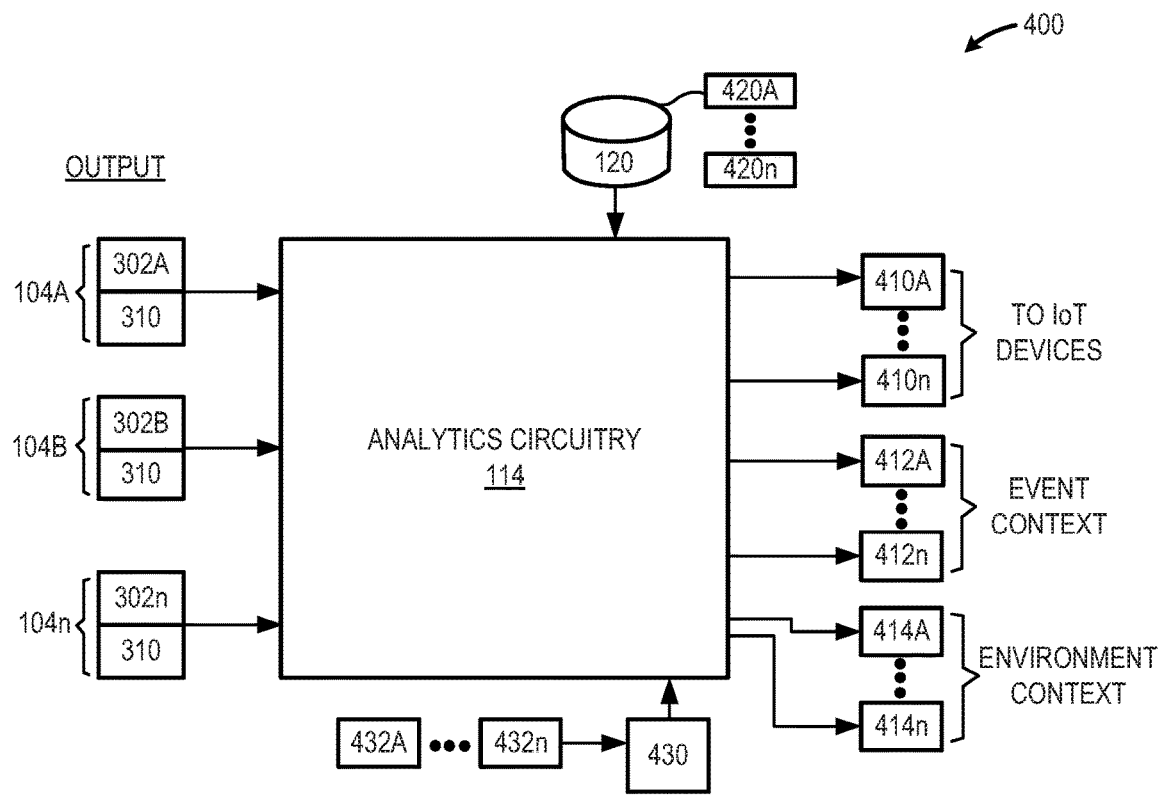
FIG. 4 is an input/output (I/O) diagram depicting an illustrative system that includes illustrative analytics circuitry, in accordance with at least one embodiment described herein.

FIG. 4 depicts an input/output (I/O) diagram of a system 400 that includes illustrative analytics circuitry 114, in accordance with at least one embodiment described herein. In embodiments, the analytics circuitry 112 may include a stand-alone device or system that includes any number and/or combination or hard-wired and/or configurable electronic components, semiconductor devices, and/or logic elements. In other embodiments, the control circuitry 110 may form all or a portion of the analytics circuitry 114. In embodiments, the analytics circuitry 114 may be disposed in a central location, for example in a network server, cloud-based server, a virtual server, an IoT gateway or similar. In other embodiments, the analytics circuitry 114 and/or the functionality performed by the analytics circuitry 114 may be distributed amongst at least a portion of the IoT devices 102.

The analytics circuitry 114 receives any number of signals 302. In at least some implementations some or all of the signal 302 provided as an input to the analytics circuitry 114 may be received from the sensor abstraction circuitry 112. In embodiments, the analytics circuitry 114 receives the signal 302 and determines whether the information and/or data 402 provided by the signals fulfills one or more defined event action criterion 420A-420n (collectively, "event action criterion 420") that may be stored or otherwise retained in the storage device 120. When the analytics circuitry 114 determines a received signal 402 fulfills the event action criterion 420, the analytics circuitry 114 generates one or more activation signals 410A-410n (collectively, "activation signal 410") used to cause the selective transition of one or more IoT devices 102 from a low-power, low-bandwidth, "STANDBY" state to a relatively higher-power, higher-bandwidth, "ACTIVE" state.

In implementations, the analytics circuitry 114 receives signal 302A and 302B from at least one sensor 104A in a first IoT device 102A and from at least one sensor 104B in a second IoT device 102B, respectively. The analytics circuitry 114 may use the received signal 302 to determine at least one event context using the information and/or data included in the received signal 302. In embodiments, the analytics circuitry 114 may use machine learning circuitry 430 to assist in the autonomous determination of the at least one event context. The analytics circuitry 114 generates one or more event output signals 412A-412n (collectively, "event output signals 412") that may include information and/or data indicative or representative of: the detected event, the event context, or combinations thereof. In some implementations, some or all of the information and/or data included in the event output signals 412 may be passed to the controller circuitry 110 for presentation to a system user, for example via the one or more user interfaces 130.

In implementations, the analytics circuitry 114 receives signal 302A from at least one sensor 104A in a first IoT device 102A and signal 302B from at least one sensor 104B in a second IoT device 102B, respectively. The analytics circuitry 114 may use some or all of the received signals 302 to determine at least one environmental context using the information and/or data included in some or all of the received signals 302. In embodiments, the analytics circuitry 114 may use machine learning circuitry 430 to assist in the autonomous determination of the at least one environmental context. The analytics circuitry 114 generates one or more environmental output signals 414A-414n (collectively, "environmental output signals 414") that may include information and/or data indicative or representative of: the detected environmental condition, the environmental context, a combined event/environmental condition, a combined event/environmental context, or combinations thereof. In some implementations, some or all of the information and/or data included in the environmental output signals 414 may be passed to the controller circuitry 110 for presentation to a system user, for example via the one or more user interfaces 130.

In embodiments, the machine learning circuitry 430 assists in the determination of an event context, an environmental context, or combinations thereof. The machine learning circuitry 430 may use one or more currently available or future developed machine learning techniques including, but not limited to: an artificial neural network, random forests, decision trees, or combinations thereof. In embodiments, the machine learning circuitry 430 may be trained using one or more training data sets 432A-432n (collectively, "training data sets 432"). The training data sets may include one or more negative training data sets 432 (e.g., logically false training data sets 432); one or more positive training data sets 432 (e.g., logically true training data sets 432); or any combination thereof.

Figure 5:
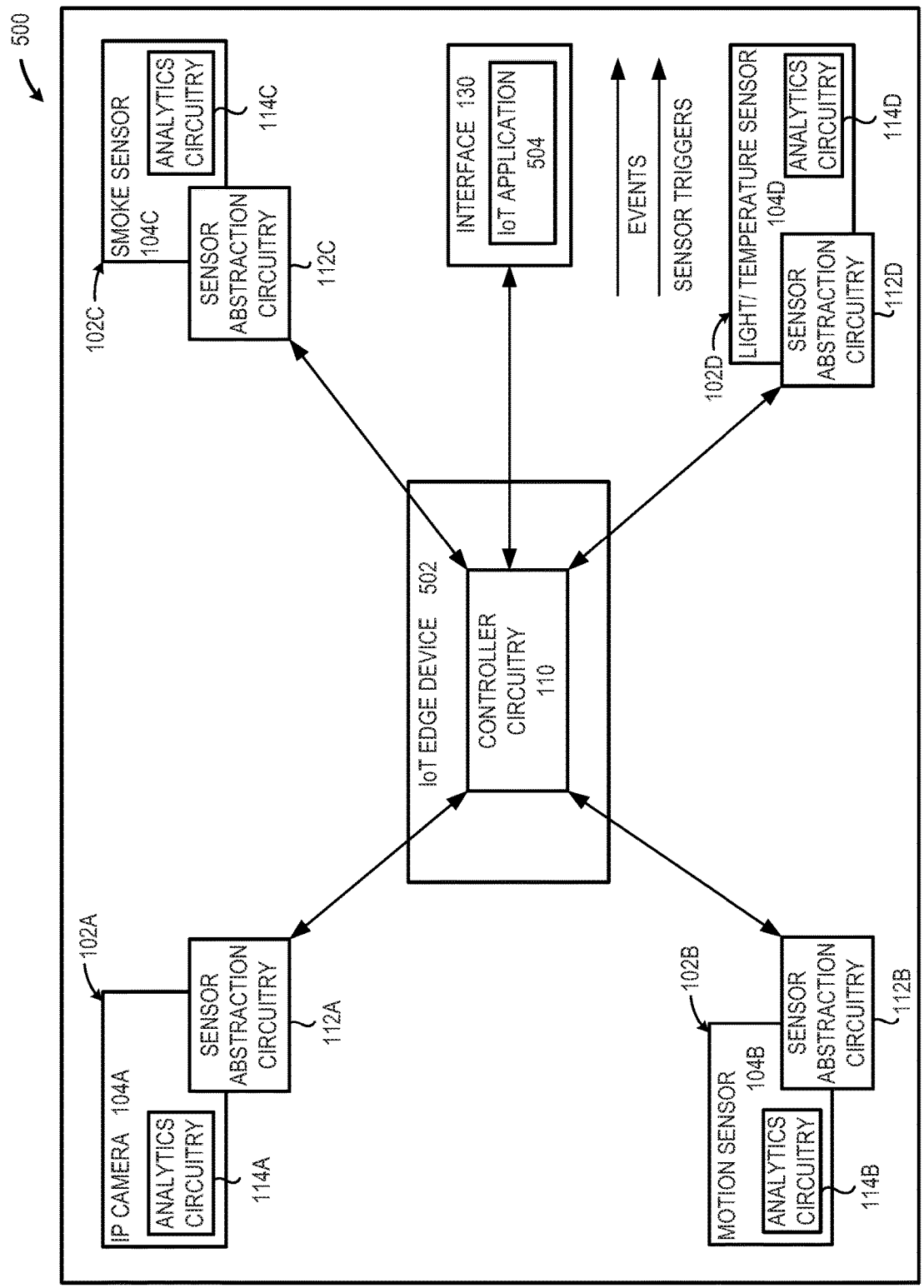
FIG. 5 is a schematic diagram depicting a system that includes an example semi-distributed system architecture in which each IoT device includes respective sensor abstraction circuitry and respective analytics circuitry in accordance with at least one embodiment described herein.

FIG. 5 is a schematic diagram depicting a system 500 that includes an example semi-distributed system architecture in which each IoT device 102A-102D includes respective sensor abstraction circuitry 112A-112D and respective analytics circuitry 114A-114D, in accordance with at least one embodiment described herein. As depicted in FIG. 5, each of the IoT devices 102 bidirectionally communicates with controller circuitry 110 disposed in an IoT edge device 502. As depicted in FIG. 5, each of the sensors 104A-104D provides a signal carrying information and/or data to the host IoT device 102A-102D, respectively. In embodiments, the analytics circuitry 114A in a first IoT device 102A analyzes the information and/or data and determines whether the information and/or data fulfills a defined event action criterion. If the information and/or data meets the defined action criterion, the IoT device 102A communicates a signal to the IoT edge device 502 (e.g., an IoT gateway device 502). The IoT edge device 502 selects a second IoT device 102B to transition from a "STANDBY" state to an "ACTIVE" state. After transitioning, the second IoT device 102B communicates additional information and/or data to the IoT edge device 502.

The analytics circuitry 114 in each of the IoT devices 102 may determine the duration of the interval over which the respective device 102 remains in an "ACTIVE" state. Thus, the analytics circuitry 114B in the second IoT device 102B determines the duration of the interval over which the second IoT device 102B remains in the "ACTIVE" state. In embodiments, the second IoT device 102B may transition from the "ACTIVE" state to the "STANDBY" state upon expiration of the interval determined by the analytics circuitry 114B. In other embodiments, the second IoT device 102B may transition from the "ACTIVE" state to the "STANDBY" state upon a completion of the detected event occurrence.

The device hosting or executing the user interface 130 may also execute one or more IoT applications 504. The one or more IoT applications 504 may be used to configure or provide information and/or data to some or all of the IoT devices 102. The one or more IoT applications 504 may be used to provide information and/or data to a system user. Such information and/or data presented to the system user may include, but is not limited to, information and/or data associated with: the event occurrence, the event context, the environmental context, or combinations thereof.

Figure 6:
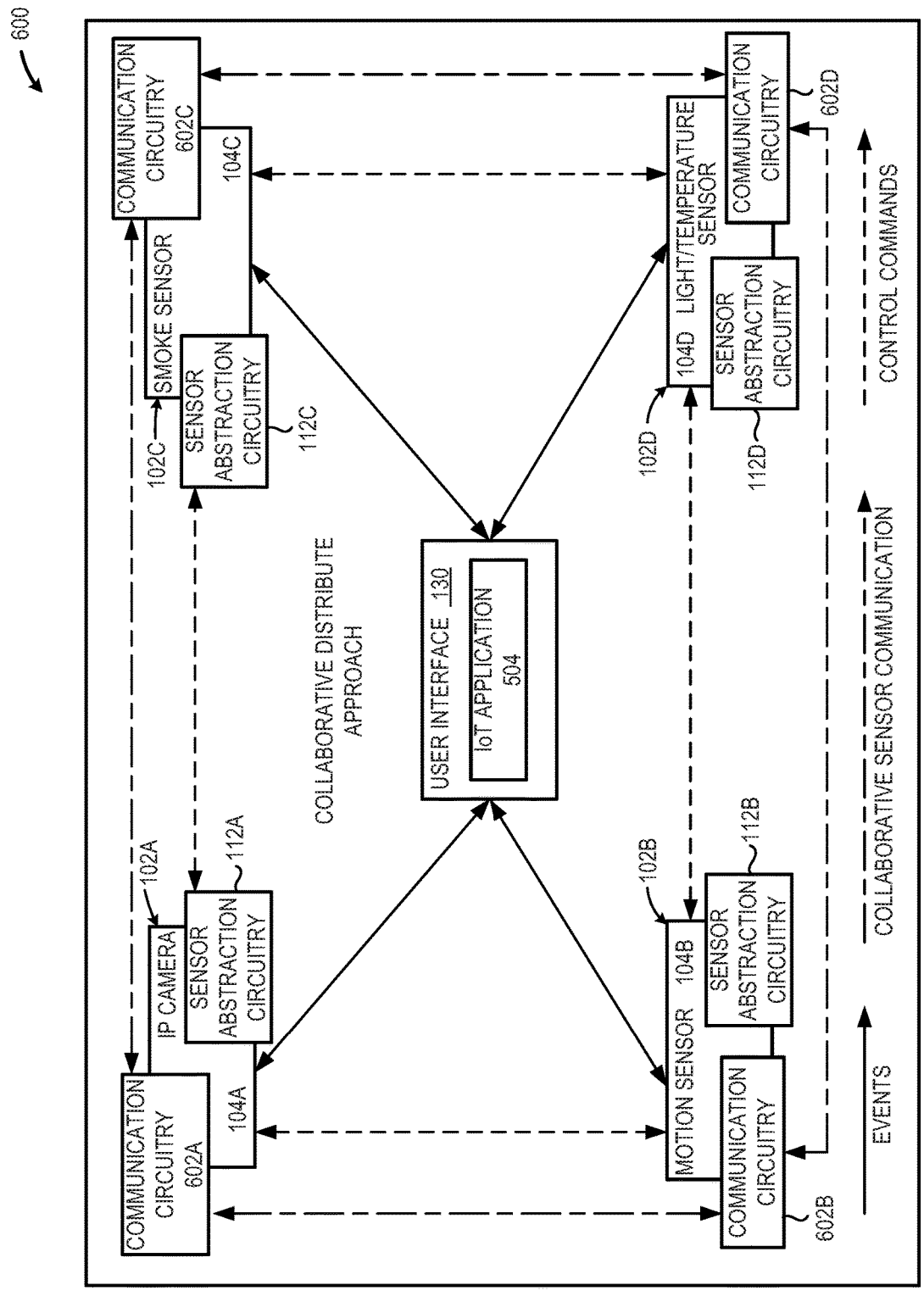
FIG. 6 is a schematic diagram depicting an illustrative distributed system architecture in which each IoT device includes respective sensor abstraction circuitry and respective analytics circuitry, in accordance with at least one embodiment described herein.

FIG. 6 is a schematic diagram depicting an illustrative distributed system architecture 600 in which each IoT device 102A-102D includes respective sensor abstraction circuitry 112A-112D and respective analytics circuitry 114A-114D, in accordance with at least one embodiment described herein. As depicted in FIG. 6, each of the IoT devices 102A-102D includes communication circuitry 602A-602D, respectively, to bidirectionally communicate with at least one other IoT device 102 in the absence of an IoT edge device. Thus, as depicted in FIG. 5, each of the IoT devices 102 includes at least a portion of the controller circuitry 110. As depicted in FIG. 6, each of the sensors 104A-104D provides a signal carrying information and/or data to the host IoT device 102A-102D, respectively. Using a common data format, the IoT host device 102 then communicates the information and/or data to at least one additional IoT device 102 in the network.

In embodiments, the analytics circuitry 114A in a first IoT device 102A analyzes the information and/or data and determines whether the information and/or data fulfills one or more defined event action criteria. If the information and/or data meets the one or more defined action criteria, the IoT device 102A communicates a signal to a second IoT device 102B. The analytics circuitry 114B in the second IoT device 102B determines whether the received information and/or data meets the one or more defined action criteria. Responsive to determining the received information and/or data meets the one or more defined action criteria, the analytics circuitry 114B in the second IoT device 102B causes the second IoT device 102B to transition from a "STANDBY" state to an "ACTIVE" state.

The analytics circuitry 114B in the second IoT device 102B may determine the duration of the interval over which the second device 102B remains in an "ACTIVE" state. In embodiments, the second IoT device 102B may transition from the "ACTIVE" state to the "STANDBY" state upon expiration of the interval determined by the analytics circuitry 114B. In other embodiments, the second IoT device 102B may transition from the "ACTIVE" state to the "STANDBY" state upon a completion of the detected event occurrence.

The device hosting or executing the user interface 130 may also execute one or more IoT applications 604. The one or more IoT applications 504 may be used to configure or provide information and/or data to some or all of the IoT devices 102. The one or more IoT applications 604 may be used to provide information and/or data to a system user. Such information and/or data presented to the system user may include, but is not limited to, information and/or data associated with: the event occurrence, the event context, the environmental context, or combinations thereof.

Figure 7:
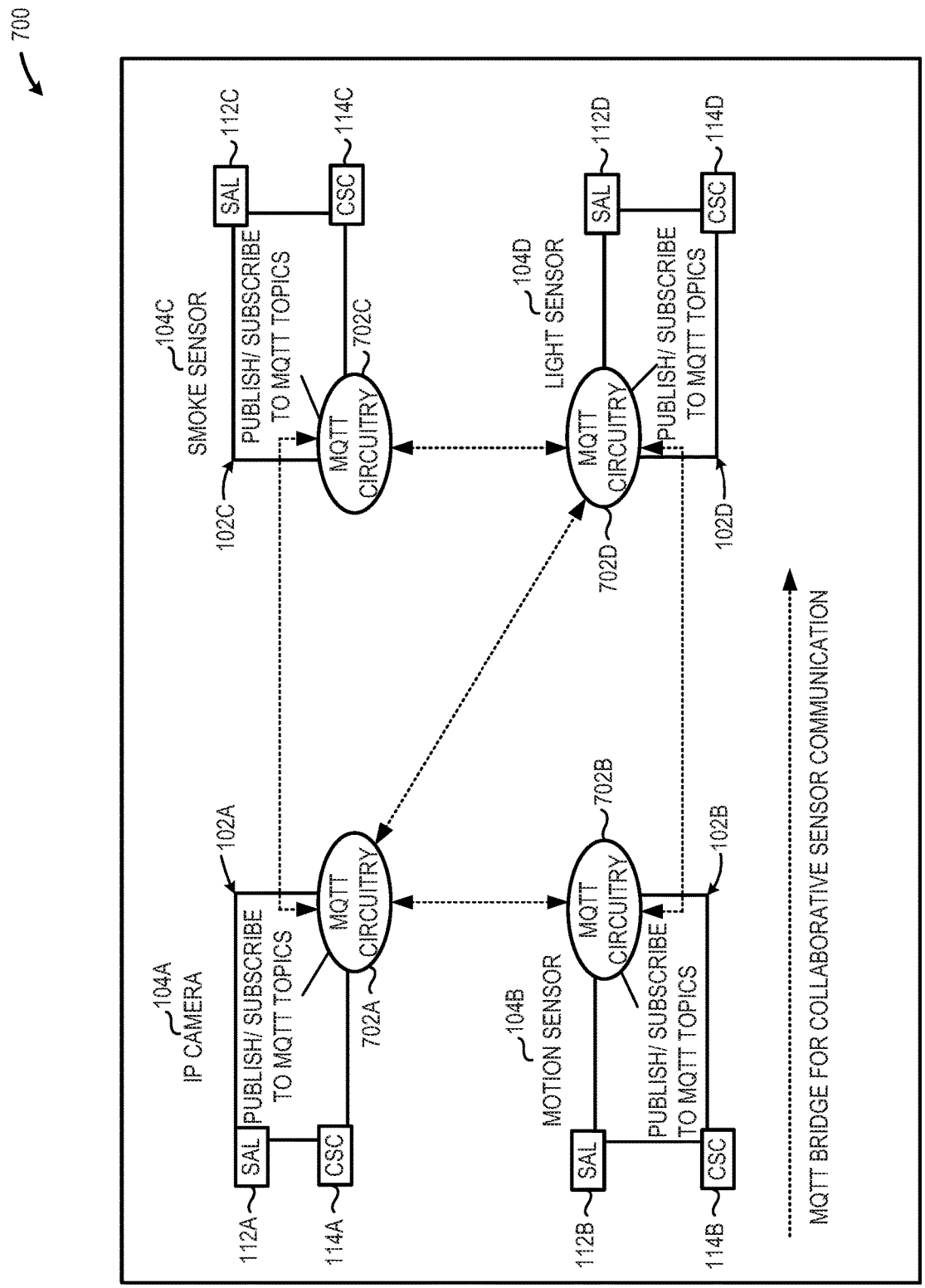
FIG. 7 is a schematic diagram depicting an illustrative IoT network using a distributed system architecture in which each IoT device includes respective sensor abstraction circuitry, respective analytics circuitry, and a respective message queueing telemetry transport ("MQTT") protocol transceiver, in accordance with at least one embodiment described herein.

FIG. 7 is a schematic diagram depicting an illustrative IoT network 700 using a distributed system architecture in which each IoT device 102A-102D includes respective sensor abstraction circuitry 112A-112D, respective analytics circuitry 114A-114D, and a respective message queueing telemetry transport ("MQTT") protocol transceiver 702A-702D, in accordance with at least one embodiment described herein. As depicted in FIG. 6, each of the IoT devices 102A-102D includes a respective message queueing telemetry transport ("MQTT") protocol compliant broker and client circuitry 702A-702D (collectively, "MQTT circuitry 702"), to enable bidirectional communication with at least one other IoT device included in the IoT network 700. In addition, as depicted in FIG. 7, each of the IoT devices 102 includes at least a portion of the controller circuitry 110.

The presence of the MQTT circuitry 702 in each of the IoT devices 102 beneficially eliminates a single point of failure system since each of the IoT devices 102 in the network 700 are able to communicate directly with the other IoT devices 106 in the network 700. In addition, each IoT device 102 in the network 700 may subscribe and publish well-defined MQTT topics defined by the sensor/software IP block to the local MQTT circuitry 702 in the respective IoT device 102. Two sensors 104A and 104B two or more distributed MQTT circuits 702A and 702B may connect via the MQTT bridging feature.

Figure 8:
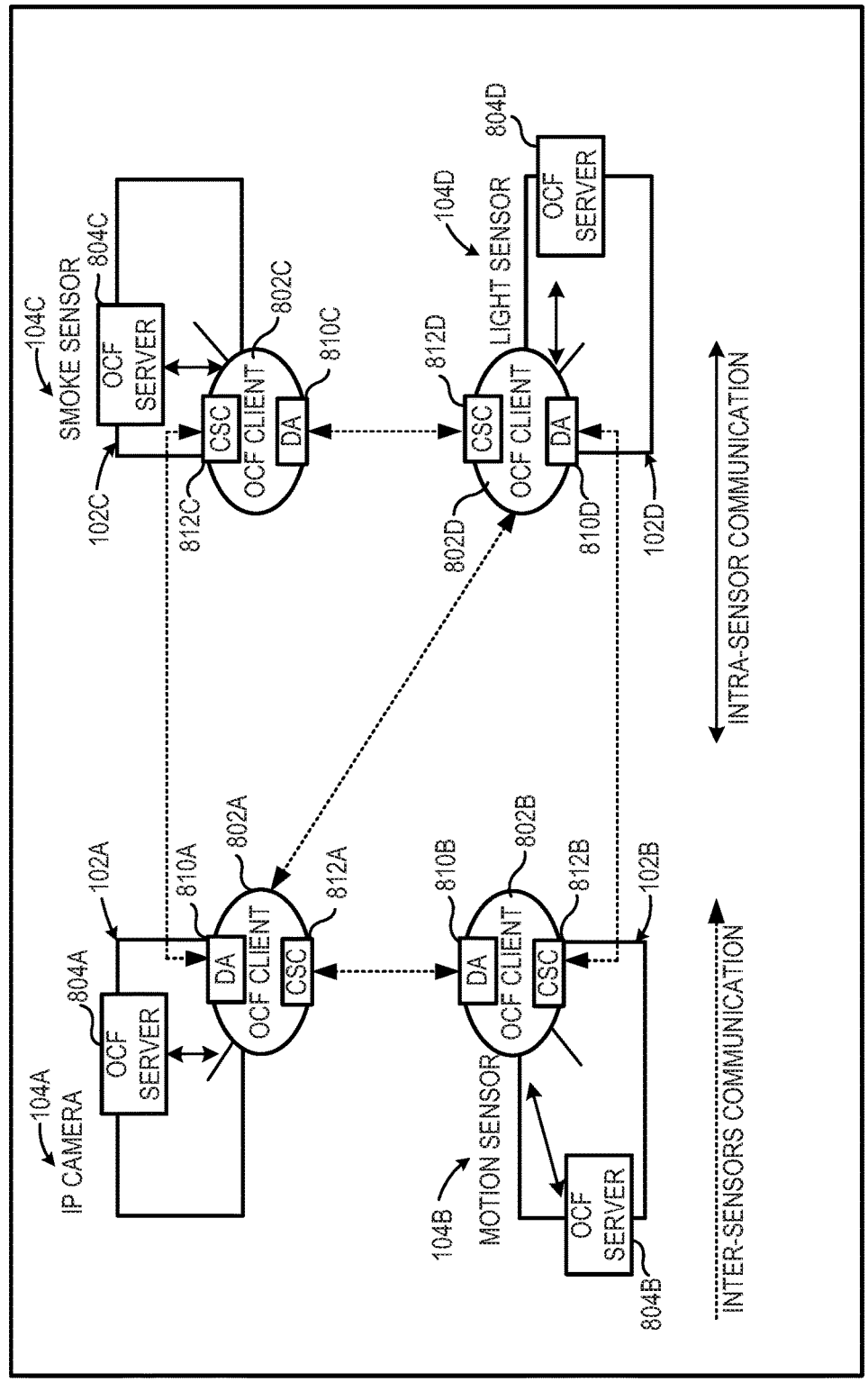
FIG. 8 is a schematic diagram depicting an illustrative IoT network using a distributed system architecture in which each IoT device includes respective sensor abstraction circuitry, respective analytics circuitry, a respective Open Connectivity Foundation ("OCF") client, and a respective OCF server in accordance with at least one embodiment described herein.

FIG. 8 is a schematic diagram depicting an illustrative IoT network 800 using a distributed system architecture in which each IoT device 102A-102D includes respective sensor abstraction circuitry 112A-112D, respective analytics circuitry 114A-114D, a respective Open Connectivity Foundation ("OCF") client 802A-802D, and a respective OCF server 804A-804D in accordance with at least one embodiment described herein. As depicted in FIG. 8, each of the IoT devices 102A-102D includes communicates with one other IoT device 102 via the OCF IoTivity framework. Thus, communication between each of the IoT devices 102 is facilitated by the presence of both an OCF client 802 and an OCF server 804 in each IoT device 102.

As depicted in FIG. 8, each IoT device 102 provides data handling via the OCF server 804. Additionally, a first IoT device 102A may coordinate communication with other IoT devices 102B-102n which function as client devices 802D-802n to the server 804A in the first IoT device 102A. The first IoT device 102A, acting as a server, is also able to selectively transition other IoT devices 102B-102n from a "STANBY" state to an "ACTIVE" state. Each OCF client 802A-802n implements data abstraction circuitry 810A-810n to model any received signals from a coupled sensor 104A-104n to a common OCF data model. Each OCF client 802A-802n further implements collaborative sensor communication circuitry 812A-812n to communicate triggering signals and/or data to other IoT devices 102 in the network 700.

Distribution of the OCF client circuitry 802A-802n and the OCF server circuitry 804A-804n to the IoT devices 102A-102n advantageously permits: communication between sensors 104A-104n; provides multi-hop communication between sensors 104A-104n; eases network deployment since a gateway or similar device is not needed; and communications between IoT devices 102 in a heterogeneous network of IoT devices 102 using differing wireless technologies since the OCF server circuitry and/or OCF client circuitry translates different wireless protocols and frequencies to a standard protocol and frequency.

Figure 9:
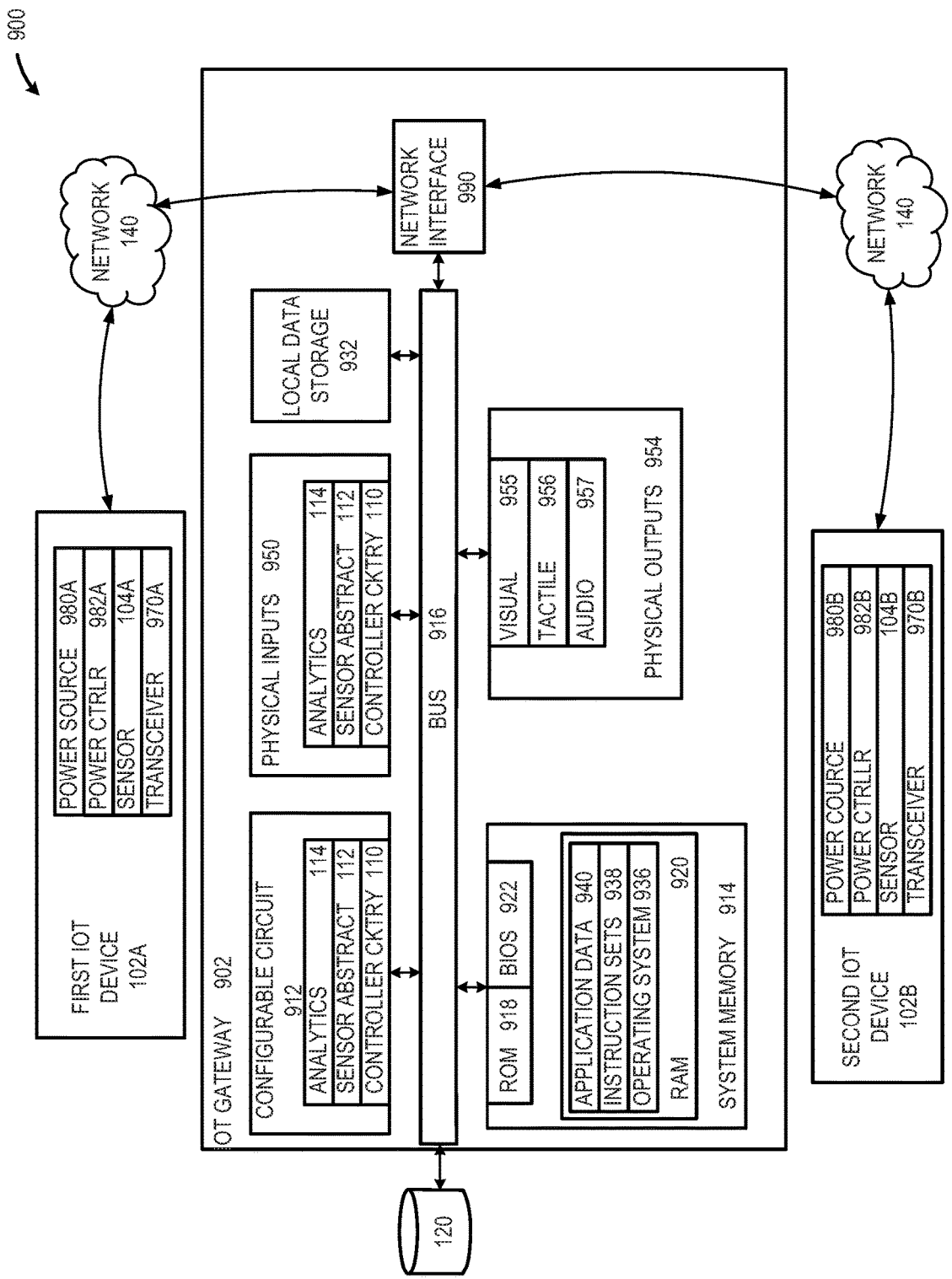
FIG. 9 is a block diagram of an illustrative system that includes a first IoT device and a second IoT device communicably coupled to an IoT gateway device, in accordance with at least one embodiment described herein.

FIG. 9 is a block diagram of an illustrative system 900 that includes a first IoT device 102A and a second IoT device 102B communicably coupled to an IoT gateway device 902, in accordance with at least one embodiment described herein. The following discussion provides a brief, general description of the components included in an illustrative IoT-based system 900 that includes a first IoT device 102A and a second IoT device 102B communicably coupled to an IoT gateway device 902 in which the various illustrated embodiments can be implemented.

Although not required, some of the embodiments may be described in the general context of machine-readable or computer-executable instruction sets, such as program application modules, objects, or macros being executed by the controller circuitry 110, the sensor abstraction circuitry 112, and/or the analytics circuitry 114. Those skilled in the relevant arts will appreciate that the illustrated embodiments as well as other embodiments can be practiced with other IoT devices that may include, but are not limited to: portable electronic or handheld electronic devices, as exemplified by smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The IoT gateway 902 may include or be formed using any number of circuits, some or all of which may include numbers and combinations of hard-wired and/or configurable electronic components, semiconductor devices, and/or logic elements that are disposed partially or wholly in a PC, server, or other computing system capable of executing machine-readable instructions. The IoT gateway 902 may include any number of configurable circuits 912, and may, at times, include a bus structure or communications link 916 communicably coupling various system components including a system memory 914 to the number of configurable circuit 912. The IoT gateway 902 may, at times, be referred to in the singular herein, but this is not intended to limit the embodiments to a single system, since in certain embodiments, there will be more than IoT gateway 902 that may incorporate any number of collocated or remote networked circuits or devices.

The configurable circuit 912 may include any number, type, or combination of devices. At times, the configurable circuit 912 may be implemented in whole or in part in the form of semiconductor devices such as diodes, transistors, inductors, capacitors, and resistors. Such an implementation may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. Unless described otherwise, the construction and operation of the various blocks shown in FIG. 9 are of conventional design. As a result, such blocks need not be described in further detail herein, as they will be understood by those skilled in the relevant art. The bus structure 916 that interconnects at least some of the components of the IoT gateway 902 may employ any known serial or parallel bus structure or architecture.

The system memory 914 may include read-only memory ("ROM") 918 and random access memory ("RAM") 920. A portion of the ROM 918 may contain a basic input/output system ("BIOS") 922. The BIOS 922 may provide basic functionality to the IoT gateway 902, for example by causing the configurable circuit 912 to load one or more machine-readable instruction sets that cause at least a portion of the configurable circuit 912 to transform, transition, provide, or otherwise function as a dedicated, specific, and particular machine, such as controller circuitry 110, sensor abstraction circuitry 112, and/or analytics circuitry 114.

A portion of the RAM 920 may include an operating system 936 for the IoT gateway 902, various machine readable instruction sets 938, and application data 940 associated with applications executed by the configurable circuit 912. The RAM 920 may have any capacity (2 gigabytes (GB), 4 GB, 8 GB, 16 GB, 32 GB, etc.). The RAM may include any type and/or configuration of data storage devices including, but not limited to, dynamic random access memory (DRAM), static random access memory (SRAM), and similar. In some implementations, a portion of RAM 920 may be used to implement one or more virtual devices, such as one or more virtual machines.

The IoT gateway 902 may include one or more communicably coupled, non-transitory, local data storage devices 932. The one or more local data storage devices 932 may include any current or future developed non-transitory storage devices. Non-limiting examples of such local data storage devices 932 may include, but are not limited to any current or future developed nontransitory storage appliances or devices, such as one or more magnetic storage devices, one or more optical storage devices, one or more solid-state electromagnetic storage devices, one or more electroresistive storage devices, one or more molecular storage devices, one or more quantum storage devices, or various combinations thereof. In some implementations, the one or more local data storage devices 932 may include one or more removable storage devices, such as one or more flash drives or similar appliances or devices.

The local one or more storage devices 932 may include interfaces or controllers (not shown) communicatively coupling the respective storage device or system to the bus structure 916, as is known by those skilled in the art. The one or more local storage devices 932 may contain machine-readable instruction sets, data structures, program modules, data stores, databases, logical structures, and/or other data useful to the controller circuitry 110, the sensor abstraction circuitry 112, and/or analytics circuitry 114 in the IoT gateway 902. In some instances, one or more external storage devices 120 may be communicably coupled to the IoT gateway 902, for example via bus structure 916 or one or more tethered or wireless networks. Such external storage devices 120 may include, but are not limited to, memory sticks, memory cards, hard disk drives, solid state drives, network connected storage (e.g., "cloud storage"), or combinations thereof.

Machine-readable instruction sets 938 and other modules 940 may be stored in whole or in part in the system memory 914. Such instruction sets 938 may be transferred from one or more storage devices 932 and/or one or more external storage devices 120 and stored in the system memory 914 in whole or in part when executed by the configurable circuity 912. For example, one or more machine-readable instruction sets 938 may cause the configurable circuit 912 to form or otherwise provide the controller circuitry 110, the sensor abstraction circuitry 112, and/or the analytics circuitry 114. One or more machine-readable instruction sets 938 may cause the sensor abstraction circuitry 112 to convert the information and/or data carried by the signals 302 received from one or more sensors 104 to a standard output signal format 310. One or more machine-readable instruction sets 938 may cause the analytics circuitry 114 to determine whether the received information and/or data fulfills one or more event action criteria 202. One or more machine-readable instruction sets 938 may cause the analytics circuitry 114 to cause a second IoT device 102B to transition from a first, low-power, state having a relatively low data transmission rate to a second, high-power, state having a relatively high data transmission rate and correspondingly high network bandwidth demand. One or more machine readable instruction sets 938 may determine an activation interval or duration during which the second IoT device 102B is maintained in the second, high-power, state. One or more machine-readable instruction sets 938 may cause the analytics circuitry 114 determine an event context using the event information and/or data received from the first IoT device 102A. One or more machine-readable instruction sets 938 may cause the analytics circuitry 114 to determine an environmental context using the information and/or data received from the first IoT device 102A and/or the second IoT device 102B. One or more machine-readable instruction sets 938 may cause the analytics circuitry 114 to establish one or more machine-learning circuits to assist with determining the event context and/or the environmental context.

System users provide, enter, or otherwise supply commands (e.g., acknowledgements, selections, confirmations, and similar) as well as information (e.g., subject identification information, color parameters) to the IoT gateway 902 using one or more communicably coupled physical input devices 950 such as one or more text entry devices 951 (e.g., "hard" or "soft" keyboards), one or more pointing devices 952 (e.g., mouse, trackball, touchscreen), and/or one or more audio input devices 953. Some or all of the physical input devices 950 may be wired or wirelessly communicably coupled to the IoT gateway 902.

System users receive output from the IoT gateway 902 via any number of physical output devices 954. Example physical output devices 954 may include, but are not limited to, any current or future developed display devices 955; tactile output devices 956; audio output devices 957, or combinations thereof. Some or all of the physical input devices 950 and some or all of the physical output devices 954 may be communicably coupled to the IoT gateway 902 via one or more tethered interfaces, hardwire interfaces, or wireless interfaces, for example a wireless device communicably coupled to the IoT gateway 902 via the network 140.

For convenience, the network interface 990, the configurable circuit 912, the system memory 914, the physical input devices 950 and the physical output devices 954 are illustrated as communicatively coupled to each other via the bus structure 916, thereby providing connectivity between the above-described components. In alternative embodiments, the above-described components may be communicatively coupled in a different manner than illustrated in FIG. 9. For example, one or more of the above-described components may be directly coupled to other components, or may be coupled to each other, via one or more intermediary components (not shown). In some embodiments, all or a portion of the bus structure 916 may be omitted and the components are coupled directly to each other using suitable tethered, hardwired, or wireless connections.

The first IoT device 102A includes a power source 980A and a power controller 982A that controls the distribution of power from the power supply 980A to the first IoT device 102A. The first IoT device 102A also includes one or more sensors $104A_1$-$104A_n$. The first IoT device 102A also includes at least one transceiver 970A to communicate with other IoT devices 102 and/or the IoT gateway 902. Similarly, the second IoT device 102B includes a power source 980B (for the first and second IoT devices, collectively: "IoT device power source 980") and a power controller 982B (for the first and second IoT devices, collectively: "IoT device power controller 982") that controls the distribution of power from the power supply 980B to the second IoT device 102B. The second IoT device 102B also includes one or more sensors $104B_1$-$104B_n$. The second IoT device 102B also includes at least one transceiver 970B (for the first and second IoT devices, collectively: "IoT device transceivers 970") to communicate with other IoT devices 102 and/or the IoT gateway 902.

The IoT device power source 980 may include any type, size, number, and/or combination of energy storage devices such as: primary (i.e., non-rechargeable) batteries, secondary (i.e., rechargeable) batteries, supercapacitors, ultracapacitors, and similar. The discharge of the IoT device power source 980 is controlled by an IoT device power controller 982. In embodiments where the IoT device 102 is a single power level device (e.g., a low-power demand device), the IoT device power controller 982 maintains the power level at the appropriate level at all times while the IoT device is operating. In embodiments where the IoT device 102 has both a first "STANDBY" state and a second "ACTIVE" state, the IoT device power controller 982 may adjust the flow of power to the IoT device 102 based on the current state of the IoT device 102. In embodiments, the IoT device power controller 982 may receive one or more external signals that cause the IoT device to transition from the first "STANDBY" state to the second "ACTIVE" state. In embodiments, the external signal may be received from the controller circuitry 110. In embodiments, the controller circuitry 110 providing the signal causing the IoT device 102 to transition from the first "STANDBY" state to the second "ACTIVE" state may be disposed in one or more IoT gateways 902 and/or one or more other IoT devices 102. The IoT device transceiver 970 may include one or more transceivers to communicably couple to the IoT gateway 902 via the network 140. In embodiments, the IoT device transceiver 970 may include discrete transmitter circuitry and discrete receiver circuitry.

Figure 10:
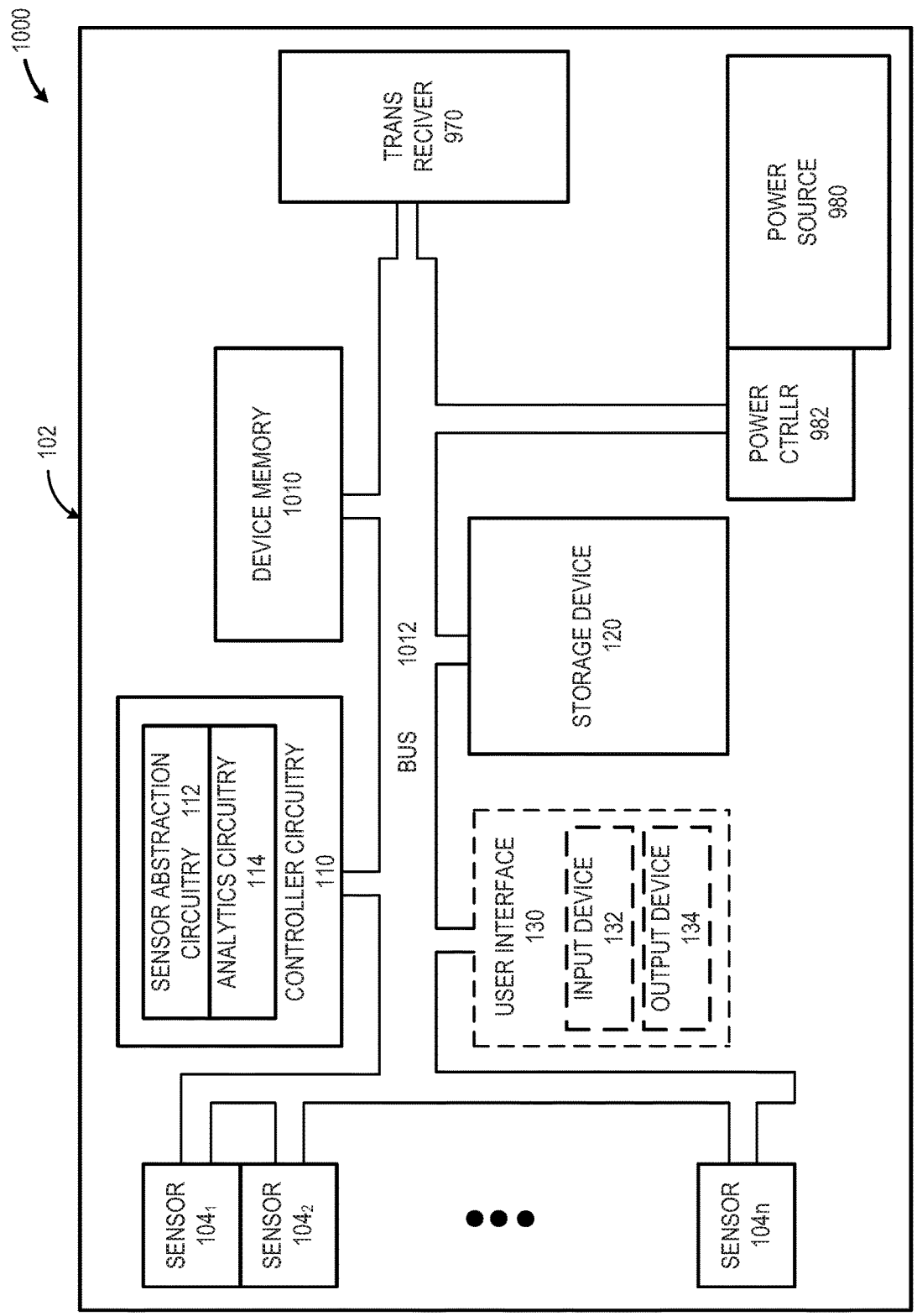
FIG. 10 is a block diagram of an illustrative system that includes an example IoT device that includes controller circuitry, sensor abstraction circuitry, and analytics circuitry, in accordance with at least one embodiment described herein.

FIG. 10 is a block diagram of an illustrative system 1000 that includes an example IoT device 102 that includes controller circuitry 110, sensor abstraction circuitry 112, and analytics circuitry 114, in accordance with at least one embodiment described herein. The following discussion provides a brief, general description of the components included in an illustrative IoT-device 102 and in which the various embodiments described herein might be implemented. The IoT device 102 may include any number of sensors $104_1$-$104_n$, controller circuitry 110, a storage device 120, at least one transceiver 970, a power source 980, a power controller 982, and a device memory 1010. A bus structure 1010 communicably couples some or all of the components within the IoT device 102. The bus 1012 may include any structure capable of bidirectionally conveying information and/or data from one component in the IoT device 102 to at least one other component in the IoT device 102.

In some implementations, the IoT device 102 may include a user interface 130 that provides a device user access to the controller circuitry 110, the sensor abstraction circuitry 112, the analytics circuitry 114, and/or the IoT device memory 1010. The IoT device 102 may include one or more input devices 132 and/or one or more output devices 134. In embodiments, the one or more input devices 132 may be disposed in, on, or about the IoT device 102 and may include, but are not limited to, any number of buttons, dials, wheels, or similar devices. In other embodiments, the one or more input devices 132 may be wirelessly communicably coupled to the IoT device 102, for example via a LAN, BLUETOOTH®, or NFC wireless connection. In embodiments, the one or more output devices 134 may be disposed in, on, or about the IoT device 102 and may include, but are not limited to, any number of indicators, illuminators, displays, or similar. In other embodiments, the one or more output devices 134 may be wirelessly communicably coupled to the IoT device 102, for example via a LAN, BLUETOOTH®, or NFC wireless connection.

Figure 11:
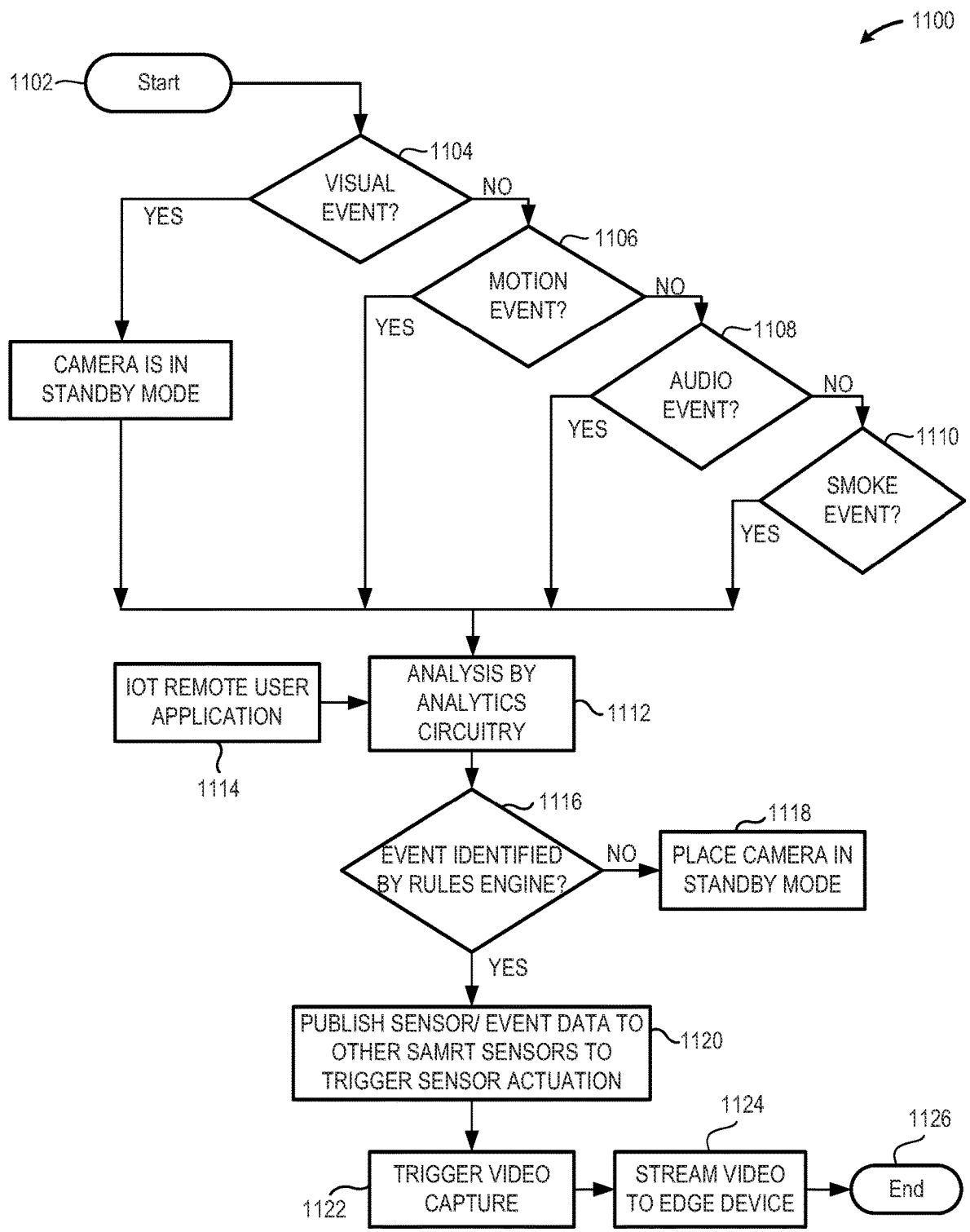
FIG. 11 is a high-level logic flow diagram of an illustrative method for collecting event information and/or data using IoT devices and an IoT gateway, in accordance with at least one embodiment described herein.

FIG. 11 is a high-level logic flow diagram of an illustrative method 1100 for collecting event information and/or data using IoT devices 102 and an IoT gateway 902, in accordance with at least one embodiment described herein. The system used to illustrate method 1100 includes four different sensors 104A-104D that, in some implementations, may each be disposed on a respective IoT device 102A-102D. The first sensor 104A includes an Internet Protocol (IP) camera. The second sensor 104B includes a motion sensor. The third sensor 104C includes an audio sensor. The fourth sensor 104D includes a smoke sensor. The method 1100 commences at 1102.

At 1104, the controller circuitry 110 determines whether the IP camera 104A has detected an occurrence of a visual event. If the controller circuitry 110 determines the IP camera 104A has detected an occurrence of a visual event, the method 1100 proceeds to 1112. If the controller circuitry 110 determines the IP camera has not detected an occurrence of a visual event, the method 1100 proceeds to 1106.

At 1106, the controller circuitry 110 determines whether the motion sensor 104B has detected an occurrence of a motion event. If the controller circuitry 110 determines the motion sensor 104B has detected an occurrence of a motion event, the method proceeds to 1112. If the controller circuitry 110 determines the motion sensor 104B has not detected a motion event, the method 1100 proceeds to 1108.

At 1108, the controller circuitry 110 determines whether the audio sensor 104C has detected an occurrence of an audio event. If the controller circuitry 110 determines the audio sensor 104C has detected an occurrence of an audio event, the method proceeds to 1112. If the controller circuitry 110 determines the audio sensor 104C has not detected an audio event, the method 1100 proceeds to 1110.

At 1110, the controller circuitry 110 determines whether the smoke sensor 104D has detected an occurrence of a smoke event. If the controller circuitry 110 determines the smoke sensor 104D has detected an occurrence of a smoke event, the method proceeds to 1112. If the controller circuitry 110 determines the smoke sensor 104D has not detected a smoke event, the method 1100 returns to 1104.

At 1112, the analytics circuitry 114 analyzes the information and/or data associated with the event occurrence. In embodiments, at 1114, all or a portion of the information and/or data used by the analytics circuitry 114 to evaluate the event occurrence may be provided by a system user via a user interface 130 communicably coupled to the IoT gateway 902 and/or one or more IoT devices 102.

At 1116, the controller circuitry 110 determines whether the event occurrence fulfills one or more event action criterion 202. In some implementations, the event action criteria 202 may be stored or otherwise retained in one or more data structures, data stores, and/or databases disposed in, on, or about the storage device 120. If, at 1116, the controller circuitry 110 determines the event occurrence fails to fulfill one or more event action criterion 202, the method 1100 proceeds at 1118, the IP camera 104A is placed in the first, "STANDBY" state and the method resumes at 1104. If, at 1116, the controller circuitry 110 determines the event occurrence fulfills one or more event action criterion 202, the method 1100 proceeds at 1120.

At 1120, responsive to the controller circuitry 110 determining the event occurrence fulfills one or more event action criterion 202, the controller circuitry 110 communicates the information and/or data associated with the event occurrence to at least a second IoT device 102B. In embodiments, publication of the event occurrence information and/or data may cause the second IoT device 102B to transition from a first, "STANDBY" state to a second "ACTIVE" state. In some implementations, the analytics circuitry 114 may receive all or a portion of the information and/or data included in the signal provided by the first IoT device 104A and all or a portion of the information and/or data included in the signal provided by the second IoT device 104B. Using the received information, the analytics circuitry 114 may determine at least an event context associated with the event occurrence. In some implementations, the analytics circuitry 114 may additionally determine at least one environmental context associated with the event occurrence.

At 1122, responsive to the controller circuitry 110 determining the event occurrence fulfills one or more event action criterion 202, the controller circuitry 110, the controller circuitry 110 causes the IP camera 104A to capture and store video images of the event occurrence. Such video images may be stored or otherwise retained as one or more files disposed in, on, or about the storage device 120. In other implementations, the controller circuitry 110 may cause one or more other sensors, such as the motion sensor 104B, the audio sensor 104C, and/or the smoke sensor 104D to acquire information and/or data associated with the event occurrence. Such information and/or data may be stored or otherwise retained as one or more files disposed in, on, or about the storage device 120.

At 1124, the controller circuitry 110 may stream all or a portion of the video capture at 1122 to one or more remote devices. For example, the controller circuitry 110 may stream a portion of the video capture of the event occurrence to a portable device such as a smartphone, wearable processor-based device, or handheld processor-based device. The method 1100 concludes at 1126.

Figure 12:
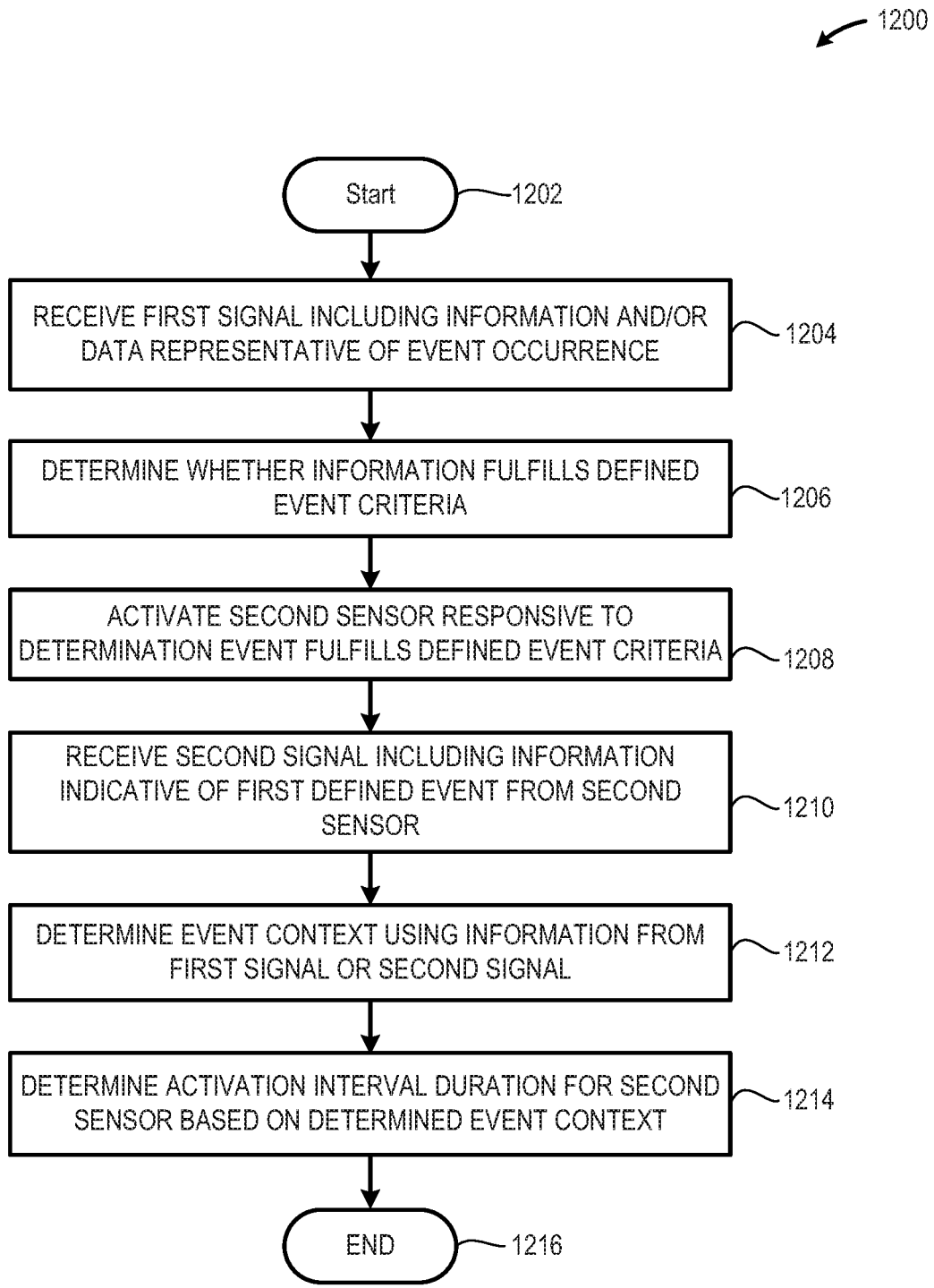
FIG. 12 is a high-level logic flow diagram of another illustrative IoT event detection method, in accordance with at least one embodiment described herein.

FIG. 12 is a high-level logic flow diagram of another illustrative IoT event detection method 1200, in accordance with at least one embodiment described herein. The method 1200 commences at 1202.

At 1204, the controller circuitry 110 receives a first signal 302A from a first IoT device 102A. The first signal 302A includes information and/or data indicative of an occurrence of an event as detected by one or more sensors 104A operably coupled to the first IoT device 102A. In embodiments, the first IoT device 102A may include one or more devices operating in a "continuous on" mode while drawing relatively little power from one or more onboard power sources 980 and consuming little network bandwidth. In embodiments, the controller circuitry 110 may be disposed in whole or in part in the first IoT device 102A. In other embodiments, the controller circuitry 110 may be disposed in whole or in part in one or more central devices such as a network server, cloud based server, or IoT gateway 902.

At 1206, the controller circuitry 110 determines whether the information and/or data received from the first IoT device 102A fulfills one or more defined event action criterion 202. In some implementations, analytics circuitry 114 formed by at least a portion of the controller circuitry 110 may determine whether the information and/or data received from the first IoT device 102A fulfills one or more event action criteria. In embodiments, the information and/or data representative of each of the defined event action criterion 202 may be stored or otherwise retained in one or more files, data structures, databases, or data stores in a local or remote connected storage device 120.

At 1208, the controller circuitry 110 causes a second IoT device 102B to transition from a first, low-power and low-bandwidth consumption state to a second, higher-power and higher-bandwidth consumption state responsive to a determination that the information and/or data received from the first IoT device 102A fulfills one or more defined event action criterion 202. In some implementations, analytics circuitry 114 formed by at least a portion of the controller circuitry 110 may cause the second IoT device 102B to transition from a first, low-power and low-bandwidth consumption state to a second, higher-power and higher-bandwidth consumption state.

At 1210, the controller circuitry 110 receives information and/or data from the second IoT device 102B. The information and/or data received from the second IoT device 102B may include: information associated with the occurrence of the defined event; environmental information associated with the occurrence of the defined event; or combinations thereof. In some implementations, analytics circuitry 114 formed by at least a portion of the controller circuitry 110 may receive all or a portion of the information and/or data received from the second IoT device 102B.

At 1212, the controller circuitry 110 determines an event context using the information and/or data received from the first IoT device 102A, the second IoT device 102B, or both. In some implementations, analytics circuitry 114 formed by at least a portion of the controller circuitry 110 may determine the event context. In some implementations, the event context may include a combination of the information and/or data provided by the first IoT device 102A with the information and/or data provided by the second IoT device 102B.

At 1214, the controller circuitry 110 determines an activation interval during which the second IoT device 102B remains in the second, higher-power and higher-bandwidth consumption state. In some implementations, the duration the second IoT device 102B remains in the second, higher-power and higher-bandwidth consumption state may be based on the event occurrence (e.g., the second IoT device 102B may remain in the second state until the event concludes) and therefore the second IoT device 102B remains in the second state for a variable amount of time dependent on the nature of the event occurrence. In some implementations, the duration the second IoT device 102B remains in the second, higher-power and higher-bandwidth consumption state may be based in whole or in part on the event context determined at 1212. The method 1200 concludes at 1216.

Figure 13:
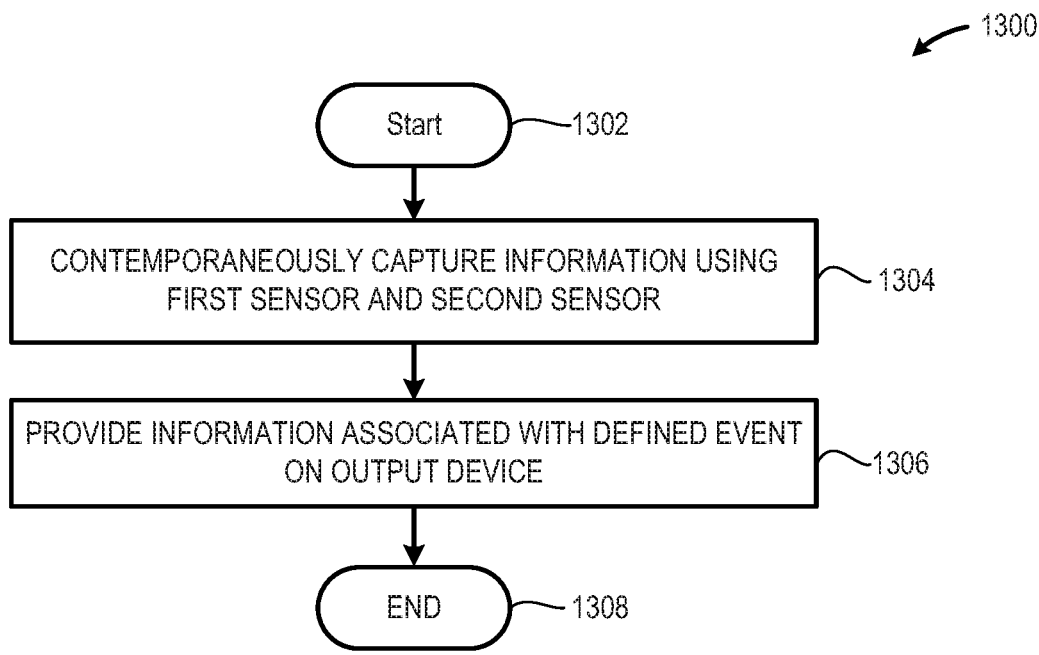
FIG. 13 is a high-level logic flow diagram of another illustrative IoT event detection method, in accordance with at least one embodiment described herein.

FIG. 13 is a high-level logic flow diagram of another illustrative IoT event detection method 1300, in accordance with at least one embodiment described herein. The method 1300 may be used alone or in conjunction with the method 1200 described in detail above. The method 1300 commences at 1302.

At 1304, the controller circuitry 110 contemporaneously captures information and/or data from the first IoT device 102A and information and/or data from the second IoT device 102B. In some implementations, analytics circuitry 114 formed by at least a portion of the controller circuitry 110 may contemporaneously capture information and/or data from the first IoT device 102A and information and/or data from the second IoT device 102B.

At 1306, the controller circuitry 110 provides all or a portion of the information and/or data received from the first IoT device 102A and all or a portion of the information and/or data from the second IoT device 102B to one or more user interfaces 130. The one or more user interfaces 130 may display all or a portion of the received information and/or data on one or more operably coupled display device. The method 1300 concludes at 1308.

Figure 14:
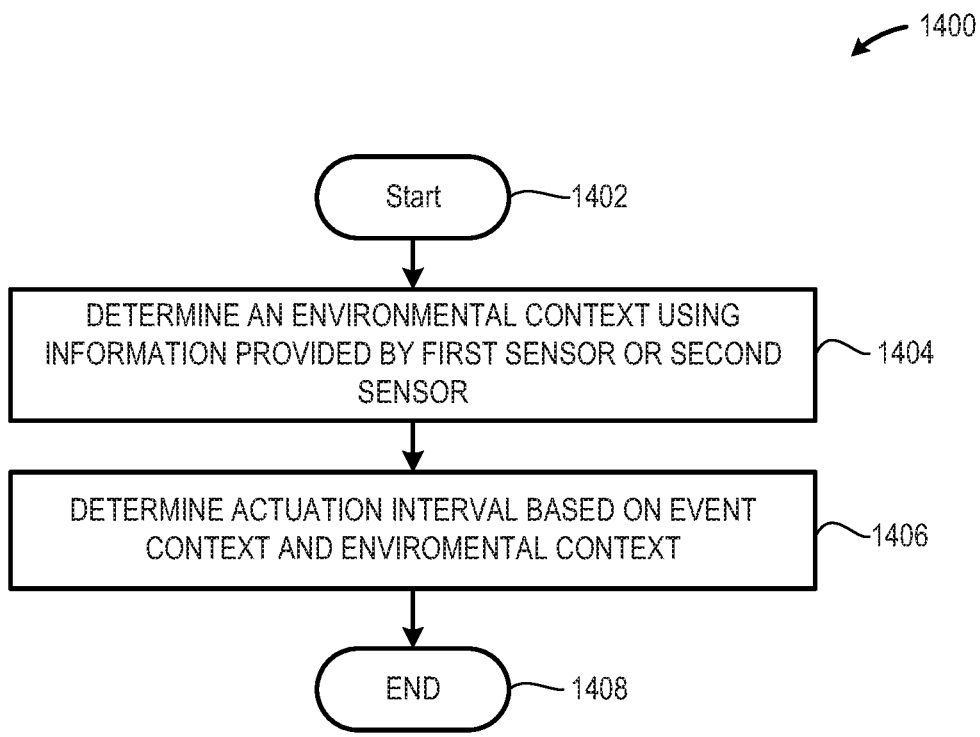
FIG. 14 is a high-level logic flow diagram of another illustrative IoT event detection method, in accordance with at least one embodiment described herein.

FIG. 14 is a high-level logic flow diagram of another illustrative IoT event detection method 1400, in accordance with at least one embodiment described herein. The method 1400 may be used alone or in conjunction with either or both of the methods 1200 and/or 1300 described in detail above. The method 1400 commences at 1402.

At 1404, the controller circuitry 110 determines an environmental context using the information and/or data received from the first IoT device 102A, the second IoT device 102B, or both. In some implementations, analytics circuitry 114 formed by at least a portion of the controller circuitry 110 may determine the environmental context. In some implementations, the environmental context may include a combination of the information and/or data provided by one or more environmental sensors 104 operably coupled to the first IoT device 102A and/or the second IoT device 102B.

At 1406, the controller circuitry 110 determines an activation interval during which the second IoT device 102B remains in the second, higher-power and higher-bandwidth consumption state. In some implementations, the duration the second IoT device 102B remains in the second, higher-power and higher-bandwidth consumption state may be based in whole or in part on the environmental context determined at 1404. The method 1400 concludes at 1406.

While FIGS. 11, 12, 13, and 14 illustrate various operations according to one or more embodiments, it is to be understood that not all of the operations depicted in FIGS. 11, 12, 13, and 14 are necessary for other embodiments. Indeed, it is fully contemplated herein that in other embodiments of the present disclosure, the operations depicted in FIGS. 11, 12, 13, and 14, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C.

As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for improving communication, collaboration, and coordination of IoT devices equipped with one or more sensors. The system and methods herein, beneficially reduce the power demand and bandwidth demand of high power IoT sensors such as Internet Protocol (IP) cameras by selectively transitioning such IoT devices having high-power, high-bandwidth requirements between a low-power/low-bandwidth STANDBY state and a relatively higher-power, higher bandwidth ACTIVE state. A controller circuit selectively transitions the high-power and/or high-bandwidth IoT devices between the STANDBY and ACTIVE states based upon information and/or data provided by relatively lower-power and lower-bandwidth IoT devices (e.g., a motion sensor) that are in an ALWAYS ON state. Further, the controller circuitry advantageously maintains the high-power/high-bandwidth IoT device in the ACTIVE state only as long as necessary, further limiting the power and bandwidth demand of such IoT devices. In some instances, the controller circuitry determines at least one of an event context associated with the detected event occurrence and/or an environmental context associated with the detected event occurrence. The controller circuitry transitions the IoT device out of the high-power/high-bandwidth ACTIVE state based at least in part on the determined event context and/or environmental context. The systems and methods described herein therefore address the technical issue of minimizing power demand and network bandwidth while advantageously retaining event detection capabilities.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for controlling a plurality of Internet of Things (IoT) devices.

According to claim 1, there is provided a system to control a plurality of Internet of Things (IoT) devices. The system may include: a plurality of sensors, each of the plurality of sensors operably coupled to a respective one of the plurality of IoT devices; at least one controller communicably coupled to at least some of the plurality of sensors; at least one user interface communicably coupled to the at least one controller, the user interface to provide information indicative of at least one defined event action criteria; at least one storage device that includes instructions that, when executed by the at least one controller, cause the at least one controller to: receive, from a first sensor in a low power operating state and included in the plurality of sensors, a first signal that includes information indicative of an occurrence of at least one defined event; determine whether the information indicative of the occurrence of the at least one defined event fulfills the at least one defined event action criteria; transition a second sensor remote from the first sensor and included in the plurality of sensors from a low-power operating state to a high-power operating state responsive to a determination that the information indicative of the occurrence of the at least one defined event fulfills the at least one defined event action criteria; receive, from the second sensor included in the plurality of sensors, a signal that includes information indicative of an occurrence of at least one defined event; determine at least one event context using at least one of: the information included in the first signal provided by the first sensor; and the information included in the second signal provided by the second sensor; and determine an activation interval duration for the second sensor based at least in part on the determined at least one event context.

Example 2 may include elements of example 1 where the instructions may further cause the at least one controller to contemporaneously capture information associated with the at least one defined event using at least the first sensor and the second sensor; and provide the information associated with the at least one defined event captured by at least the first sensor and the second sensor to the at least one user interface.

Example 3 may include elements of example 1 where the instructions may further cause the at least one controller to: determine at least one environmental context using at least one of: the information provided by the first sensor; and the information provided by the second sensor; and determine an activation interval duration for the second sensor based at least in part on the at least one determined event context and the at least one determined environmental context.

Example 4 may include elements of example 1 where the instructions may further cause the at least one controller to communicate the information associated with the at least one defined event to at least some of the sensors included in the plurality of sensors responsive to a determination by the at least one controller that the information indicative of the occurrence of the at least one defined event fulfills the at least one defined event action criteria.

Example 5 may include elements of example 1 where the first sensor includes a first type of sensing element, wherein the second sensor includes a second type of sensing element; and wherein the first type of sensing element differs from the second type of sensing element.

Example 6 may include elements of example 1 where the at least one controller may include at least one of: sensor abstraction circuitry or analytics circuitry disposed in each of at least some of the plurality of sensors.

Example 7 may include elements of example 6 where each of the plurality of sensors may be communicably coupled to at least one other of the plurality of sensors.

Example 8 may include elements of example 7 where the controller in each of at least some of the plurality of sensors may communicate with a controller in at least one other of some of the plurality of sensors using a Message Queueing Telemetry Transport (MQTT) protocol and an Open Communication Foundation (OCF) framework.

Example 9 may include elements of example 7 where the instructions may be individually executed by at least one of: the sensor abstraction circuitry or the analytics circuitry in each of the at least some of the plurality of sensors.

Example 10 may include elements of example 9 where the instructions that cause the at least one controller to determine at least one event context using at least one of: the information provided by the first sensor; and the information provided by the second sensor, may further cause the at least one controller to determine, by analytics circuitry coupled to the first sensor, a first event context using the information provided by the first sensor; communicate, via communication circuitry coupled to the first sensor, the determined first event context to analytics circuitry disposed in the second sensor; determine, by the analytics circuitry coupled to the second sensor, a second event context using the information provided by the first sensor; communicate, via communication circuitry coupled to the second sensor, the determined second event context to the analytics circuitry coupled to the first sensor; and determine, by the analytics circuitry coupled to the first sensor and the analytics circuitry disposed in the second sensor, the at least one event context based at least in part on the determined first event context and the determined second event context.

Example 11 may include elements of example 9 where the instructions that cause the at least one controller to determine at least one event context using at least one of: the information provided by the first sensor; and the information provided by the second sensor, may further cause the at least one controller to: communicate, via communication circuitry coupled to the first sensor, information provided by the first sensor to analytics circuitry coupled to the second sensor; communicate, via communication circuitry coupled to the second sensor, information provided by the second sensor to the first controller; and determine, by analytics circuitry coupled to the first sensor, the event context based on the information provided by the first sensor and the information provided by the second sensor.

Example 12 may include elements of example 11 where the instructions that cause the at least one controller to determine at least one event context using at least one of: the information provided by the first sensor; and the information provided by the second sensor, may further cause the at least one controller to determine, by analytics circuitry coupled to the second sensor, the event context based on the information provided by the first sensor and the information provided by the second sensor.

Example 13 may include elements of example 1 where the at least one controller may include a central controller communicably coupled to each sensor included in the plurality of sensors.

Example 14 may include elements of example 13 where each of the plurality of sensors may be communicably coupled via communication circuitry to at least one other of the plurality of sensors.

Example 15 may include elements of example 13 where the controller in each of at least some of the plurality of sensors may communicate with a controller in at least one other of some of the plurality of sensors using a Message Queueing Telemetry Transport (MQTT) protocol and an Open Communication Foundation (OCF) framework.

According to example 16, there is provided a method of controlling a plurality of Internet of Things (IoT) devices. The method may include receiving, by at least one controller, a first signal that includes information indicative of an occurrence of at least one defined event, the first signal provided by a first sensor included in a plurality of sensors communicably coupled to the at least one controller, wherein each of the plurality of sensors is operably coupled to a respective one of the plurality of IoT devices; determining, by the at least one controller, whether the information indicative of the occurrence of the at least one defined event fulfills the at least one defined event action criteria; activating, by the at least one controller, a second sensor included in the plurality of sensors responsive to a determination by the at least one controller that the information indicative of the occurrence of the at least one defined event fulfills the at least one defined event action criteria; receiving a second signal that includes information indicative of the occurrence of the at least one defined event, the second signal provided by the second sensor included in a plurality of sensors communicably coupled to the at least one controller; determining, by the at least one controller, at least one event context using at least one of: the information provided by the first sensor; and the information provided by the second sensor; and determining, by the at least one controller, an activation interval duration for the second sensor based at least in part on the determined at least one event context.

Example 17 may include elements of example 16, and the method may additionally include contemporaneously capturing, by the at least one controller, information associated with the at least one defined event using at least the first sensor and the second sensor; and causing, by the at least one controller, a display of the information associated with the at least one defined event captured by at least the first sensor and the second sensor on at least one user interface communicably coupled to the at least one controller.

Example 18 may include elements of example 16 and the method may further include determining, by the at least one controller, at least one environmental context using at least one of: the information provided by the first sensor; and the information provided by the second sensor; and determining, by the at least one controller, an activation interval duration for the second sensor based at least in part on the at least one determined event context and the at least one determined environmental context.

Example 19 may include elements of example 16, and the method may further include communicating, by the at least one controller, the information associated with the at least one defined event to at least some of the sensors included in the plurality of sensors responsive to a determination by the at least one controller that the information indicative of the occurrence of the at least one defined event fulfills the at least one defined event action criteria.

Example 20 may include elements of example 16 where receiving a first signal provided by a first sensor comprises receiving the first signal provided by a first sensor that includes a first type of sensing element; wherein receiving a second signal provided by a second sensor comprises receiving the second signal provided by a second type of sensing element that differs from the first type of sensing element.

Example 21 may include elements of example 16, and the method may further include communicably coupling the plurality of sensors such that each sensor included in the plurality of sensors communicably couples to at least one other sensor included in the plurality of sensors; wherein each respective one of at least some of the plurality of IoT devices includes at least a portion of the at least one controller including at least one of: sensor abstraction circuitry or analytics circuitry.

Example 22 may include elements of example 21 where communicably coupling the plurality of sensors such that each sensor included in the plurality of sensors communicably couples to at least one other sensor included in the plurality of sensors may include communicably coupling the plurality of sensors such that each sensor included in the plurality of sensors communicably couples to at least one other sensor included in the plurality of sensors using a Message Queueing Telemetry Transport (MQTT) protocol and an Open Communication Foundation (OCF) framework.

Example 23 may include elements of example 21 where determining at least one event context using at least one of: the information provided by the first sensor; and the information provided by the second sensor may include determining, by analytics circuitry coupled to the first sensor, a first event context using the information provided by the first sensor; communicating, via communications circuitry coupled to the first sensor, the determined first event context to analytics circuitry coupled to the second sensor; determining, the analytics circuitry coupled to the second sensor, a second event context using the information provided by the first sensor; communicating, via communications circuitry coupled to the second sensor, the determined second event context to the analytics circuitry coupled to the first sensor; and determining, by the analytics circuitry coupled to the first sensor and the analytics circuitry coupled to the second sensor, the at least one event context based at least in part on the determined first event context and the determined second event context.

Example 24 may include elements of example 21 where determining at least one event context using at least one of: the information provided by the first sensor; and the information provided by the second sensor may include: communicating, via communications circuitry coupled to the first sensor, information provided by the first sensor to analytics circuitry coupled to the second sensor; communicating, via communications circuitry coupled to the second sensor, information provided by the second sensor to the analytics circuitry coupled to the first sensor; and determining, by the analytics circuitry coupled to the first sensor, the event context based on the information provided by the first sensor and the information provided by the second sensor.

Example 25 may include elements of example 24 where determining at least one event context using at least one of: the information provided by the first sensor; and the information provided by the second sensor may include determining, by the analytics circuitry coupled to the second sensor, the event context based on the information provided by the first sensor and the information provided by the second sensor.

Example 26 may include elements of example 16 where the at least one controller may include a central controller communicably coupled to each sensor included in the plurality of sensors.

Example 27 may include elements of example 26, and the method may further include communicably coupling each of the plurality of sensors to the central controller.

Example 28 may include elements of example 27, and the method may further include communicably coupling each of at least some of the plurality of sensors to at least one other of the plurality of sensors.

Example 29 may include elements of example 27 where communicably coupling each of the plurality of sensors to the central controller may include communicably coupling each of the plurality of sensors to the central controller using a Message Queueing Telemetry Transport (MQTT) protocol and an Open Communication Foundation (OCF) framework.

According to example 30, there is provided a non-transitory machine-readable medium that includes instructions, that when executed by at least one controller, may cause the at least one controller to: receive a first signal that includes information indicative of an occurrence of at least one defined event, the first signal provided by a first sensor included in a plurality of sensors communicably coupled to the at least one controller, wherein each of the plurality of sensors is operably coupled to a respective one of a corresponding plurality of IoT devices; determine whether the information indicative of the occurrence of the at least one defined event fulfills the at least one defined event action criteria; activate a second sensor included in the plurality of sensors responsive to a determination by the at least one controller that the information indicative of the occurrence of the at least one defined event fulfills the at least one defined event action criteria; receive a second signal that includes information indicative of the occurrence of the at least one defined event, the second signal provided by the second sensor included in a plurality of sensors communicably coupled to the at least one controller; determine at least one event context using at least one of: the information included in the first signal provided by the first sensor; and the information included in the second signal provided by the second sensor; and determine an activation interval duration for the second sensor based at least in part on the determined at least one event context.

Example 31 may include elements of example 30 where the machine-readable medium includes instructions that may further cause the at least one controller to: contemporaneously capture information associated with the at least one defined event using at least the first sensor and the second sensor; and cause a display of the information associated with the at least one defined event captured by at least the first sensor and the second sensor on at least one user interface communicably coupled to the at least one controller.

Example 32 may include elements of example 30 where the machine-readable medium includes instructions that may further cause the at least one controller to: determine at least one environmental context using at least one of: the information provided by the first sensor; and the information provided by the second sensor; and determine an activation interval duration for the second sensor based at least in part on the at least one determined event context and the at least one determined environmental context.

Example 33 may include elements of example 30 where the machine-readable medium includes instructions that may further cause the at least one controller to: communicate the information associated with the at least one defined event to at least some of the sensors included in the plurality of sensors responsive to a determination by the at least one controller that the information indicative of the occurrence of the at least one defined event fulfills the at least one defined event action criteria.

Example 34 may include elements of example 30 where the instructions that cause the at least one controller to receive a first signal provided by a first sensor included in a plurality of sensors further cause the at least one controller to: receive a first signal provided by a first sensor that includes a first type of sensing element; where the instructions that cause the at least one controller to receive a second signal provided by the second sensor included in a plurality of sensors may further cause the at least one controller to: receive a second signal provided by a second sensor that includes a second type of sensing element.

Example 35 may include elements of example 30 where the instructions that cause the at least one controller to receive a first signal provided by a first sensor included in a plurality of sensors may further cause the at least one controller to: receive, by a first controller coupled to the first sensor, a first signal provided by a first sensor that includes a first type of sensing element; where the instructions that cause the at least one controller to receive a second signal provided by the second sensor included in a plurality of sensors may further cause the at least one controller to: receive, by a second controller coupled to the second sensor, a second signal provided by a second sensor that includes a second type of sensing element.

Example 36 may include elements of example 35 where the instructions may further cause the at least one controller to: communicably couple the plurality of sensors such that each sensor included in the plurality of sensors communicably couples to at least one other sensor included in the plurality of sensors; where each respective one of at least some of the plurality of IoT devices includes at least a portion of the at least one controller that includes at least one of: sensor abstraction circuitry or analytics circuitry.

Example 37 may include elements of example 36 where the instructions that cause the at least one controller to communicably couple the plurality of sensors such that at least the first controller communicably couples to the second controller may further cause the at least one controller to: communicably couple the plurality of sensors such that at least the first controller communicably couples to the second controller using a Message Queueing Telemetry Transport (MQTT) protocol and an Open Communication Foundation (OCF) framework.

Example 38 may include elements of example 30 where the instructions that cause the at least one controller to determine at least one event context may further cause the at least one controller to: determine, by analytics circuitry coupled to the first sensor, a first event context using the information provided by the first sensor; communicate, via communications circuitry coupled to the first sensor, the determined first event context to analytics circuitry coupled to the second sensor; determine, by the analytics circuitry coupled to the second sensor, a second event context using the information received from the first sensor; communicate, via communication circuitry coupled to the second sensor, the determined second event context to the analytics circuitry coupled to the first sensor; and determine, by the analytics circuitry coupled to the first sensor and the analytics circuitry coupled to the second sensor, the at least one event context based at least in part on the determined first event context and the determined second event context.

Example 39 may include elements of example 30 where the instructions that cause the at least one controller to determine at least one event context may further cause the at least one controller to: communicate, via communications circuitry coupled to the first sensor, information provided by the first sensor to analytics circuitry coupled to the second sensor; communicate, via communications circuitry coupled to the second sensor, information provided by the second sensor to the analytics circuitry coupled to the first sensor; and determine, by the analytics circuitry coupled to the first sensor, the event context based on the information provided by the first sensor and the information received from the second sensor.

Example 40 may include elements of example 39 where the instructions that cause the at least one controller to determine at least one event context may further cause the at least one controller to: determine, by the analytics circuitry coupled to the second sensor, the event context based on the information received from the first sensor and the information provided by the second sensor.

Example 41 may include elements of example 30 where the instructions may further cause the at least one controller to communicably couple each of the plurality of sensors to a central controller.

Example 42 may include elements of example 41 where the instructions further cause the at least one controller to communicably couple each of at least some of the plurality of sensors to at least one other of the plurality of sensors.

Example 43 may include elements of example 42 where the instructions that cause the at least one controller to communicably couple each of at least some of the plurality of sensors to at least one other of the plurality of sensors may further cause the at least one controller to: communicably couple each of the plurality of sensors to the central controller and communicably couple each of at least some of the plurality of sensors to at least one other of the plurality of sensors using a Message Queueing Telemetry Transport (MQTT) protocol and an Open Communication Foundation (OCF) framework.

According to example 44, there is provided a system for controlling a plurality of Internet of Things (IoT) devices. The system may include: a means for receiving a first signal that includes information indicative of an occurrence of at least one defined event, the first signal provided by a first sensor included in a plurality of sensors communicably coupled to the at least one controller, wherein each of the plurality of sensors is operably coupled to a respective one of the plurality of IoT devices; a means for determining whether the information indicative of the occurrence of the at least one defined event fulfills the at least one defined event action criteria; a means for activating a second sensor included in the plurality of sensors responsive to a determination by the at least one controller that the information indicative of the occurrence of the at least one defined event fulfills the at least one defined event action criteria; a means for receiving a second signal that includes information indicative of the occurrence of the at least one defined event, the second signal provided by the second sensor included in a plurality of sensors communicably coupled to the at least one controller; a means for determining at least one event context using at least one of: the information provided by the first sensor; and the information provided by the second sensor; and a means for determining an activation interval duration for the second sensor based at least in part on at least one event context.

Example 45 may include elements of example 44, and the system may further include a means for contemporaneously capturing information associated with the at least one defined event using at least the first sensor and the second sensor; and a means for causing a display of the information associated with the at least one defined event captured by at least the first sensor and the second sensor on at least one user interface communicably coupled to the at least one controller.

Example 46 may include elements of example 44, and the system may further include a means for determining, by the at least one controller, at least one environmental context using at least one of: the information provided by the first sensor; and the information provided by the second sensor; and a means for determining an activation interval duration for the second sensor based at least in part on the at least one determined event context and the at least one determined environmental context.

Example 47 may include elements of example 44, and the system may further include: a means for communicating the information associated with the at least one defined event to at least some of the sensors included in the plurality of sensors responsive to a determination by the at least one controller that the information indicative of the occurrence of the at least one defined event fulfills the at least one defined event action criteria.

Example 48 may include elements of example 44 where receiving a first signal provided by a first sensor may include receiving the first signal provided by a first sensor that includes a first type of sensing element; where receiving a second signal provided by a second sensor comprises receiving the second signal provided by a second type of sensing element that differs from the first type of sensing element.

Example 49 may include elements of example 44, and the system may further include: a means communicably coupling the plurality of sensors such that each sensor included in the plurality of sensors communicably couples to at least one other sensor included in the plurality of sensors.

Example 50 may include elements of example 49 where the means for determining at least one event context may include: a means for determining, at the first sensor, a first event context using the information provided by the first sensor; a means for communicating the determined first event context from the first sensor to a second sensor; a means for determining, at the second sensor, a second event context using the information provided by the first sensor; a means for communicating the determined second event context from the second sensor to the first sensor; and a means for determining the at least one event context based at least in part on the determined first event context and the determined second event context.

Example 51 may include elements of example 49 where the means for determining at least one event context may include: a means for communicating information provided by the first sensor to the second sensor; a means for communicating information provided by the second sensor to the first sensor; and a means for determining, at the first sensor, the event context based on the information provided by the first sensor and the information provided by the second sensor.

Example 52 may include elements of example 51 where determining at least one vent context may include: a means for determining, at the second sensor, the event context based on the information provided by the first sensor and the information provided by the second sensor.

Example 53 may include elements of example 44, and the system may further include a means for communicably coupling each of the plurality of sensors to a central controller.

Example 54 may include elements of example 53 where the means for communicably coupling each of the plurality of sensors to a central controller further may include: a means for communicably coupling each of the plurality of sensors to the central controller using a Message Queueing Telemetry Transport (MQTT) protocol and an Open Communication Foundation (OCF) framework.

According to example 55, there is provided a system for controlling a plurality of Internet of Things (IoT) devices, the system being arranged to perform the method of any of examples 16 through 29.

According to example 56, there is provided a chipset arranged to perform the method of any of examples 16 through 29.

According to example 57, there is provided a non-transitory machine readable medium comprising a plurality of instructions that, in response to be being executed on a computing device, cause the computing device to carry out the method according to any of examples 16 through 29.

According to example 58, there is provided a device configured to control a plurality of Internet of Things (IoT) devices, the device being arranged to perform the method of any of examples 16 through 29.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A system comprising:
a first Internet of Things (IoT) device that includes a first sensor to provide a first signal that includes information indicative of a defined event occurrence;
a second IoT device physically separate from the first IoT device, the second IoT device including a second sensor to provide a second signal that includes information indicative of the defined event occurrence, the second sensor having a first, relatively lower-power, standby state and a second, relatively higher-power, active state;
at least one controller communicatively coupled to the first sensor and the second sensor;
at least one user interface communicatively coupled to the at least one controller, the user interface to provide information indicative of at least one defined event action criteria;
at least one storage device that includes instructions that, when executed by the at least one controller, cause the at least one controller to:
receive, the first first signal from the first sensor;

determine whether the defined event occurrence information included in the first signal fulfills at least one defined event action criteria;
cause the second sensor to transition from the standby state to the active state responsive to a determination that the defined event occurrence information included in the first signal fulfills the at least one defined event action criteria;
receive, the second signal from the second sensor;
determine at least one event context using:
the defined event occurrence information included in the first signal; and
the defined event occurrence information included in the second signal; and
determine a temporal activation interval duration during which the second sensor remains in the active state based at least in part on the determined at least one event context.

2. The system of claim 1 wherein the instructions further cause the at least one controller to:
contemporaneously capture the defined event occurrence information using at least the first sensor and the second sensor; and
provide the defined event occurrence information to the at least one user interface.

3. The system of claim 1 wherein the instructions further cause the at least one controller to:
determine at least one environmental context using at least one of:
the defined event occurrence information provided by the first sensor; and
the defined event occurrence information provided by the second sensor; and
determine the temporal activation interval duration for the second sensor based at least in part on the at least one event context and the determined at least one environmental context.

4. The system of claim 1 wherein the instructions further cause the at least one controller to:
communicate the information associated with the determined at least one defined event to a third sensor responsive to a determination by the at least one controller that the information indicative of the defined event occurrence of the at least one defined event fulfills the at least one defined event action criteria.

5. The system of claim 1:
wherein the first sensor includes a first type of sensing element;
wherein the second sensor includes a second type of sensing element; and
wherein the first type of sensing element differs from the second type of sensing element.

6. The system of claim 1:
wherein the system includes a plurality of Internet of Things (IoT) devices;
wherein each respective one of at least some of the plurality of IoT devices includes the at least one controller;
wherein each respective controller includes at least one of: sensor abstraction circuitry or analytics circuitry; and
wherein the instructions are individually executed in each of the at least some of the IoT devices by at least one of: the sensor abstraction circuitry or the analytics circuitry.

7. The system of claim 6 wherein the instructions that cause the at least one controller to determine at least one event context using: the information provided by the first sensor; and the information provided by the second sensor, further cause the at least one controller to:
determine, by analytics circuitry coupled to the first sensor, a first event context using the information provided by the first sensor;
communicate, via communications circuitry coupled to the first sensor, the determined first event context to analytics circuitry coupled to the second sensor;
determine, by analytics circuitry coupled to the second sensor, a second event context using the information provided by the first sensor;
communicate, via communications circuitry coupled to the second sensor, the determined second event context to the analytics circuitry coupled to the first sensor; and
determine, by the analytics circuitry coupled to the first sensor and the analytics circuitry coupled to the second sensor, the at least one event context based at least in part on the determined first event context and the determined second event context.

8. The system of claim 6 wherein the instructions that cause the at least one controller to determine at least one event context using: the information provided by the first sensor; and the information provided by the second sensor, further cause the at least one controller to:
communicate, via communication circuitry coupled to the first sensor, information provided by the first sensor to the analytics circuitry coupled to the second sensor;
communicate, via communications circuitry coupled to the second sensor, information provided by the second sensor to the analytics circuitry in the first sensor; and
determine, by the analytics circuitry coupled to the first sensor, the at least one event context based on the information provided by the first sensor and the information received from the second sensor.

9. The system of claim 8, wherein the instructions that cause the at least one controller to determine at least one event context using: the information provided by the first sensor and the information provided by the second sensor, further cause the at least one controller to:
determine, by the analytics circuitry coupled to the second sensor, the at least one event context based on the information received from the first sensor and the information provided by the second sensor.

10. The system of claim 1:
wherein the system includes a plurality of Internet of Things (IoT) devices;
wherein each of the plurality of IoT devices includes at least one first sensor and at least one second sensor;
wherein the at least one controller comprises a central controller communicably coupled to at least one of the first sensor or the second sensor in each of at least some of the plurality of IoT devices; and
wherein the first sensor and the second sensor in each of the at least some of the plurality of IoT devices are communicatively coupled to each other.

11. A method comprising:
receiving, by at least one controller, a first signal that includes information indicative of a defined event occurrence, the first signal provided by a first sensor coupled to a first IoT device, the first sensor communicatively coupled to the at least one controller;
determining, by the at least one controller, whether the defined event occurrence information included in the first signal fulfills at least one defined event action criteria;

causing, by the at least one controller, a second sensor coupled to a second IoT device remote from the first IoT device to transition from a first, relatively lower-power state to a second, relatively higher-power state, responsive to a determination by the at least one controller that the defined event occurrence information included in the first signal fulfills the at least one defined event action criteria;

receiving a second signal from the second sensor, the second signal including defined event occurrence information;

determining, by the at least one controller, at least one event context using:
the defined event occurrence information provided by the first sensor; and
the defined event occurrence information provided by the second sensor; and determining, by the at least one controller, a temporal activation interval duration during which the second sensor second, relatively higher-power state based at least in part on the determined at least one event context.

12. The method of claim 11, further comprising:
contemporaneously capturing, by the at least one controller, the defined event occurrence information using at least the first sensor and the second sensor; and
causing, by the at least one controller, a display of the defined event occurrence information captured by at least the first sensor and the second sensor on at least one user interface communicably coupled to the at least one controller.

13. The method of claim 11, further comprising:
determining, by the at least one controller, at least one environmental context using:
the defined event occurrence information provided by the first sensor; and
the defined event occurrence information provided by the second sensor; and
determining, by the at least one controller, the temporal activation interval duration for the second sensor based at least in part on the determined at least one event context and the determined at least one environmental context.

14. The method of claim 11, further comprising:
communicating, by the at least one controller, the defined event occurrence information to at least a third sensor responsive to a determination by the at least one controller that the defined event occurrence information fulfills the at least one defined event action criteria.

15. The method of claim 11:
wherein receiving a first signal provided by a first sensor comprises receiving the first signal provided by a first sensor that includes a first type of sensing element;
wherein receiving a second signal provided by a second sensor comprises receiving the second signal provided by a second type of sensing element that differs from the first type of sensing element.

16. The method of claim 11, further comprising:
communicatively coupling each of at least some of a plurality of sensors disposed in respective ones of a plurality of Internet of Things (IoT) devices such that each sensor included in the plurality of sensors communicably couples to at least one other sensor included in the plurality of sensors;
wherein each respective one of at least some of the plurality of IoT devices includes at least a portion of the at least one controller including at least one of: sensor abstraction circuitry or analytics circuitry;
wherein the first IoT device and the second IoT device are included in the plurality of IoT devices; and
wherein the first sensor and the second sensor are included in the plurality of sensors.

17. The method of claim 16 wherein determining at least one event context using: the information provided by the first sensor and the information provided by the second sensor comprises:
determining, by analytics circuitry coupled to the first sensor, a first event context using the information provided by the first sensor;
communicating, by communications circuitry coupled to the first sensor, the determined first event context to analytics circuitry coupled to the second sensor;
determining, by the analytics circuitry coupled to the second sensor, a second event context using the information received from the first sensor;
communicating, via communications circuitry coupled to the second sensor, the determined second event context to the analytics circuitry coupled to the first sensor; and
determining, by the analytics circuitry coupled to the first sensor and the analytics circuitry coupled to the second sensor, the at least one event context based at least in part on the determined first event context and the determined second event context.

18. The method of claim 16 wherein determining at least one event context using: the information provided by the first sensor and the information provided by the second sensor comprises:
communicating, via communication circuitry coupled to the first sensor, information provided by the first sensor to analytics circuitry coupled to the second sensor;
communicating, via communications circuitry coupled to the second sensor, information provided by the second sensor to the analytics circuitry coupled to the first sensor; and
determining, by the analytics circuitry coupled to the first sensor, the event context based on the information provided by the first sensor and the information received from the second sensor.

19. The method of claim 18 wherein determining at least one event context using: the information provided by the first sensor and the information provided by the second sensor comprises:
determining, by the analytics circuitry coupled to the second sensor, the event context based on the information received from the first sensor and the information provided by the second sensor.

20. The method of claim 11, further comprising:
communicably coupling each of at least some of a plurality of sensors disposed in respective ones of a plurality of Internet of Things (IoT) devices to the at least one controller wherein the at least one controller comprises a central controller communicably coupled to each sensor included in the plurality of sensors;
wherein the first IoT device and the second IoT device are included in the plurality of IoT devices; and
wherein the first sensor and the second sensor are included in the plurality of sensors.

21. The method of claim 20, further comprising:
communicably coupling each of at least some of the plurality of sensors to at least one other sensor included in the plurality of sensors.

22. A non-transitory machine-readable medium that includes instructions, that when executed by at least one controller, causes the at least one controller to:
- receive a first signal from a first sensor that includes information indicative of a defined event occurrence, the first sensor coupled to a first IoT device, the first sensor communicatively coupled to the at least one controller;
- determine whether the defined event occurrence information included in the first signal fulfills at least one defined event action criteria;
- cause a second sensor to transition from a first, relatively lower-power, state to a second, relatively higher-power, state responsive to a determination by the at least one controller that the defined event occurrence information fulfills the at least one defined event action criteria wherein the second sensor is coupled to a second IoT device physically separate from the first IoT device;
- receive a second signal from the second sensor, the second signal including information indicative of the defined event occurrence;
- determine at least one event context using:
  - the defined event occurrence information included in the first signal provided by the first sensor; and
  - the defined event occurrence information included in the second signal provided by the second sensor; and
- determine a temporal activation interval duration during which the second sensor remains in the second, relatively higher-power, state based at least in part on the determined at least one event context.

23. The machine readable medium of claim 22 wherein the machine-readable medium includes instructions that further cause the at least one controller to:
- contemporaneously capture the defined event occurrence information event using at least the first sensor and the second sensor; and
- cause a display of the defined event occurrence information captured by at least the first sensor and the second sensor on at least one user interface communicably coupled to the at least one controller.

24. The machine readable medium of claim 22 wherein the machine-readable medium includes instructions that further cause the at least one controller to:
- determine at least one environmental context using at least one of:
  - the defined event occurrence information provided by the first sensor; and
  - the defined event occurrence information provided by the second sensor; and
- determine the temporal activation interval duration for the second sensor based at least in part on the at least one determined event context and the at least one determined environmental context.

25. The machine readable medium of claim 22 wherein the machine-readable medium includes instructions that further cause the at least one controller to:
- communicate the defined event occurrence information associated with the at least one defined event to at least some of the sensors included in a plurality of sensors responsive to a determination by the at least one controller that the defined event occurrence information fulfills the at least one defined event action criteria;
- wherein the first IoT device and the second IoT device are included in the plurality of IoT devices; and
- wherein the first sensor and the second sensor are included in the plurality of sensors.

* * * * *